US012668104B2

(12) United States Patent
Lee et al.

(10) Patent No.: US 12,668,104 B2
(45) Date of Patent: Jun. 30, 2026

(54) REFRIGERANT MODULE AND INTEGRATED THERMAL MANAGEMENT MODULE FOR VEHICLE INCLUDING THE SAME

(71) Applicants:Hyundai Motor Company, Seoul (KR); Kia Corporation, Seoul (KR); Hyundai WIA Corporation, Changwon-si (KR)

(72) Inventors: Sang Shin Lee, Suwon-si (KR); Ki Mok Kim, Busan (KR); Man Ju Oh, Yongin-si (KR); Je Min Yeon, Incheon (KR); Man Hee Kim, Seoul (KR); Se Min Lee, Uiwang-si (KR)

(73) Assignees: Hyundai Motor Company, Seoul (KR); Kia Corporation, Seoul (KR); Hyundai WIA Corporation, Changwon-si (KR)

(*) Notice: Subject to any disclaimer, the term of this patent is extended or adjusted under 35 U.S.C. 154(b) by 171 days.

(21) Appl. No.: 18/360,309

(22) Filed: Jul. 27, 2023

(65) Prior Publication Data

US 2024/0181846 A1      Jun. 6, 2024

(30) Foreign Application Priority Data

Dec. 6, 2022     (KR) ........................ 10-2022-0169075

(51) Int. Cl.
B60H 1/32          (2006.01)
B60H 1/00          (2006.01)
F25B 40/00         (2006.01)
F25B 40/02         (2006.01)

F25B 40/06         (2006.01)
F25B 41/40         (2021.01)
(Continued)

(52) U.S. Cl.
CPC ....... B60H 1/3229 (2013.01); B60H 1/00571 (2013.01); B60H 1/3227 (2013.01); B60H 1/32284 (2019.05); F25B 40/00 (2013.01); F25B 41/40 (2021.01); F25B 43/006 (2013.01); F28D 7/106 (2013.01); F25B 40/02 (2013.01); F25B 40/06 (2013.01)

(58) Field of Classification Search
CPC ............. B60H 1/00571; B60H 1/3227; B60H 1/3229; B60H 1/00278; F25B 40/00; F25B 40/02; F25B 40/06
See application file for complete search history.

(56) References Cited

U.S. PATENT DOCUMENTS

| | | | | |
|---|---|---|---|---|
| 5,899,091 | A | * | 5/1999 | Fraser, Jr. ............. F25B 31/002 |
| | | | | 62/473 |
| 7,726,151 | B2 | * | 6/2010 | Manole ................... F28D 7/106 |
| | | | | 122/18.1 |
| 9,303,925 | B2 | * | 4/2016 | Zhang ................... F28D 7/1684 |

(Continued)

*Primary Examiner* — Christopher R Zerphey
(74) *Attorney, Agent, or Firm* — Slater Matsil, LLP

(57)          ABSTRACT

A refrigerant module includes a compressor configured to discharge the refrigerant after compressing the refrigerant, a condensation core configured to discharge the refrigerant discharged from the compressor after the refrigerant exchanges heat with a coolant, an evaporation core configured to discharge the refrigerant discharged from an expansion valve after the refrigerant exchanges heat with a coolant, and a refrigerant multi-channel plate formed to have a plate shape.

26 Claims, 18 Drawing Sheets

(51) Int. Cl.
    *F25B 43/00*         (2006.01)
    *F28D 7/10*          (2006.01)

(56)         References Cited

U.S. PATENT DOCUMENTS

| | | | | |
|---|---|---|---|---|
| 11,192,425 B2 * | 12/2021 | Oh | ..................... | B60H 1/00007 |
| 11,440,376 B2 * | 9/2022 | Calderone | .............. | F25B 41/40 |
| 11,453,267 B2 * | 9/2022 | Koberstein | ........ | B60H 1/00907 |
| 2004/0089439 A1 * | 5/2004 | Treverton | ............ | F28D 7/0025 |
| | | | | 165/41 |
| 2010/0230082 A1 * | 9/2010 | Patel | ........................ | F28F 1/08 |
| | | | | 29/890.036 |
| 2018/0135916 A1 * | 5/2018 | Sueyoshi | ........... | B60H 1/00342 |
| 2019/0039440 A1 | 2/2019 | Calderone | | |
| 2019/0070924 A1 | 3/2019 | Mancini et al. | | |
| 2022/0194167 A1 * | 6/2022 | Morimoto | .......... | B60H 1/00571 |
| 2022/0332162 A1 * | 10/2022 | Lee | .................... | B60H 1/00278 |
| 2022/0377946 A1 * | 11/2022 | Artmeier | ............ | B60H 1/00485 |
| 2024/0167769 A1 * | 5/2024 | Rhee | ..................... | B60K 11/02 |

* cited by examiner

REFRIGERANT MODULE AND INTEGRATED THERMAL MANAGEMENT MODULE FOR VEHICLE INCLUDING THE SAME

CROSS-REFERENCE TO RELATED APPLICATIONS

This application claims the benefit of Korean Patent Application No. 10-2022-0169075, filed on Dec. 6, 2022, in the Korean Intellectual Property Office, the disclosure of which is incorporated herein by reference.

TECHNICAL FIELD

The present invention relates to a refrigerant module and an integrated thermal management module for a vehicle including the same.

BACKGROUND

Recently, realization of eco-friendly technologies and solution of problems such as exhaustion of energy, etc. have become a social issue. To overcome these issues, an electric vehicle has been developed.

The electric vehicle is driven using a motor configured to receive electricity from a battery, thereby outputting power. In this regard, the electric vehicle is being highlighted as an eco-friendly vehicle by virtue of advantages of no emission of carbon dioxide, reduced noise, and higher energy efficiency than that of an internal combustion engine vehicle.

A core technology for implementation of such an electric vehicle is technology associated with a battery module. Recently, active research on weight reduction, miniaturization, reduced recharging time, etc. of a battery has been conducted. The battery module may maintain optimal performance and long lifespan only when the battery module is used in an optimal temperature environment. In current situations, however, it is difficult to use the battery module in an optimal temperature environment due to heat generated during driving of the battery module and a variation in ambient temperature.

In addition, in the electric vehicle, heating for a passenger compartment of the vehicle is performed in winter using an electric heater because there is no waste heat source generated during combustion in a separate engine. Furthermore, the electric vehicle requires warmup in order to enhance charging and discharging performance of the battery in cold weather. To this end, the electric vehicle is equipped with a separate electric heater for heating of a coolant.

That is, technology for operating a cooling/heating system for control of a battery module temperature in order to optimally maintain a temperature environment of the battery module, separately from a cooling/heating system for air conditioning of the passenger compartment of the vehicle, is used.

In other words, two independent cooling/heating systems, one of which is used for cooling/heating of a passenger compartment, the other of which is used for control of a battery module temperature, are installed in the electric vehicle.

However, when such cooling/heating systems operate in the above-described manner, efficient energy management is impossible. For this reason, long-distance driving is impossible due to a short range of the vehicle, and the driving distance is reduced by 30% when cooling is performed in summer, and is reduced by 40% or more when heating is performed in winter. As a result, a problem associated with heating in winter, which does not occur in an internal combustion engine, becomes more severe. When a high-capacity PTC is provided to solve such a problem occurring in heating in winter, there are problems of a reduction in range and excessively increased costs and weight caused by use of a heat pump.

To this end, technology for configuring an assembly of two independent cooling/heating systems through effective disposition of the cooling/heating systems, thereby achieving easy installation of the assembly in a vehicle while reducing weight and costs, has been developed.

In particular, as Freon gas has recently been recognized as a main cause of environmental pollution, technology for reducing a use amount of a refrigerant has been developed.

The above matters disclosed in this section are merely for enhancement of understanding of the general background of the invention and should not be taken as an acknowledgement or any form of suggestion that the matters form the related art already known to a person skilled in the art.

SUMMARY

The present invention relates to a refrigerant module and an integrated thermal management module for a vehicle including the same, and in particular embodiments to a refrigerant module in which complicated parts and lines associated with a coolant and a refrigerant are modularized through integration, and parts, through which coolants of different temperature ranges circulate, respectively, are modularized while being distinguished from the former parts and lines, thereby being capable of achieving an enhancement in thermal management efficiency while achieving compactness of the parts, and an integrated thermal management module for a vehicle including the same.

Therefore, the present invention has been made in view of the above problems. Embodiment of the present invention can provide a refrigerant module in which complicated parts and lines associated with a coolant and a refrigerant are modularized through integration, and parts, through which coolants of different temperature ranges circulate, respectively, are modularized while being distinguished from the former parts and lines, thereby being capable of achieving an enhancement in thermal management efficiency while achieving compactness of the parts, and an integrated thermal management module for a vehicle including the same.

Other embodiments of the present invention provide a refrigerant module capable of achieving an enhancement in heat exchange efficiency thereof with a coolant while minimizing a path through which a refrigerant circulates.

In accordance with an embodiment of the present invention, the above and other embodiments can be accomplished by the provision of a refrigerant module configured to force a refrigerant to circulate through a compressor, a condensation core, an expansion valve, and an evaporation core, the refrigerating module including the compressor configured to discharge the circulating refrigerant after compressing the refrigerant, the condensation core configured to discharge the refrigerant discharged from the compressor after forcing the refrigerant to exchange heat with a coolant, the evaporation core configured to discharge the refrigerant discharged from the expansion valve after forcing the refrigerant to exchange heat with a coolant, and a refrigerant multi-channel plate formed to have a plate shape, wherein the compressor and the expansion valve are disposed at one side of the refrigerant multi-channel plate, and the condensation core and the evaporation core are disposed at another side of the refrigerant multi-channel plate, and wherein the refrigerant multi-channel plate is formed therein with a first inner refrigerant channel configured to provide a path guiding the refrigerant discharged from the condensation core to be sucked into the expansion valve, and a second inner refrigerant channel configured to provide a path guiding the refrigerant discharged from the evaporation core to be sucked into the compressor.

The compressor and the condensation core may be directly interconnected while extending through the refrigerant multi-channel plate. The condensation core and the expansion valve may be mounted to the refrigerant multi-channel plate, and may be interconnected by the first inner refrigerant channel. The expansion valve and the evaporation core may be directly interconnected while extending through the refrigerant multi-channel plate. The evaporation core and the compressor may be mounted to the refrigerant multi-channel plate, and may be interconnected by the second inner refrigerant channel.

The refrigerant multi-channel plate may be formed with a compressor inlet and a compressor outlet coupled to the compressor, a condensation core inlet and a condensation core outlet coupled to the condensation core, an expansion valve inlet and an expansion valve outlet coupled to the expansion valve, and an evaporation core inlet and an evaporation core outlet coupled to the evaporation core. The compressor outlet and the condensation core inlet may be formed at opposite surfaces of the refrigerant multi-channel plate, respectively, to communicate with each other, thereby directly interconnecting the compressor and the condensation core. The condensation core outlet and the expansion valve inlet may be interconnected by the first inner refrigerant channel. The expansion valve outlet and the evaporation core inlet may be formed at the opposite surfaces of the refrigerant multi-channel plate, respectively, to communicate with each other, thereby directly interconnecting the expansion valve and the evaporation core. The evaporation core outlet and the compressor inlet may be interconnected by the second inner refrigerant channel.

The refrigerant module may further include a receiver dryer provided at the one side of the refrigerant multi-channel plate and configured to separate the refrigerant discharged from the condensation core into a liquid-phase refrigerant and a gas-phase refrigerant and to discharge the gas-phase refrigerant into the expansion valve, and an accumulator provided at the one side of the refrigerant multi-channel plate and configured to separate the refrigerant discharged from the evaporation core into a liquid-phase refrigerant and a gas-phase refrigerant and to discharge the gas-phase refrigerant into the compressor. The first inner refrigerant channel of the refrigerant multi-channel plate may be divided into a 1-1-th inner refrigerant channel configured to provide a path guiding the refrigerant discharged from the condensation core to be sucked into the receiver dryer and a 1-2-th inner refrigerant channel configured to provide a path guiding a refrigerant discharged from the receiver dryer to be sucked into the expansion valve. The second inner refrigerant channel of the refrigerant multi-channel plate may be divided into a 2-1-th inner refrigerant channel configured to provide a path guiding the refrigerant discharged from the evaporation core to be sucked into the accumulator and a 2-2-th inner refrigerant channel configured to provide a path guiding the refrigerant discharged from the accumulator to be sucked into the compressor.

The refrigerant module may further include a heat exchange pipe formed to have a double pipe structure having an inner pipe and an outer pipe. The inner pipe may be connected, at one end thereof, to the second inner refrigerant channel while being connected, at another end thereof, to the compressor such that the refrigerant discharged from the evaporation core flows through the heat exchange pipe. The outer pipe may be connected, at opposite sides thereof, to the first inner refrigerant channel such that the refrigerant discharged from the condensation core flows through the outer pipe and exchanges heat with the refrigerant flowing through the inner pipe.

The compressor and the condensation core may be directly interconnected while extending through the refrigerant multi-channel plate. The condensation core and the expansion valve may be mounted to the refrigerant multi-channel plate, and may be interconnected by the first inner refrigerant channel and the outer pipe of the heat exchange pipe. The expansion valve and the evaporation core may be directly interconnected while extending through the refrigerant multi-channel plate. The evaporation core and the compressor may be mounted to the refrigerant multi-channel plate, and may be interconnected by the second inner refrigerant channel and the inner pipe of the heat exchange pipe. The compressor and the inner pipe of the heat exchange pipe may be directly interconnected while extending through the refrigerant multi-channel plate.

The refrigerant multi-channel plate may be formed with a compressor inlet and a compressor outlet coupled to the compressor, a condensation core inlet and a condensation core outlet coupled to the condensation core, an expansion valve inlet and an expansion valve outlet coupled to the expansion valve, and an evaporation core inlet and an evaporation core outlet coupled to the evaporation core. The compressor outlet and the condensation core inlet may be formed at opposite surfaces of the refrigerant multi-channel plate, respectively, to communicate with each other, thereby directly interconnecting the compressor and the condensation core. The condensation core outlet and the expansion valve inlet may be interconnected by the first inner refrigerant channel and the outer pipe of the heat exchange pipe. The expansion valve outlet and the evaporation core inlet may be formed at the opposite surfaces of the refrigerant multi-channel plate, respectively, to communicate with each other, thereby directly interconnecting the expansion valve and the evaporation core. The evaporation core outlet may be connected to the inner pipe of the heat exchange pipe via the second inner refrigerant channel. The compressor inlet and the inner pipe of the heat exchange pipe may be disposed at the opposite surfaces of the refrigerant multi-channel plate, respectively, to communicate with each other, thereby directly interconnecting the compressor and the inner pipe of the heat exchange pipe.

The refrigerant module may further include a receiver dryer provided at the one side of the refrigerant multi-channel plate and configured to separate the refrigerant discharged from the condensation core into a liquid-phase refrigerant and a gas-phase refrigerant and to discharge the gas-phase refrigerant into the expansion valve, and an accumulator provided at the one side of the refrigerant multi-channel plate and configured to separate the refrigerant discharged from the evaporation core into a liquid-phase refrigerant and a gas-phase refrigerant and to discharge the gas-phase refrigerant into the compressor. The first inner refrigerant channel of the refrigerant multi-channel plate may be divided into a 1-1-th inner refrigerant channel configured to provide a path guiding the refrigerant discharged from the condensation core to be sucked into the receiver dryer and a 1-2-th inner refrigerant channel configured to provide a path guiding a refrigerant discharged from the receiver dryer to be sucked into the expansion valve. An inlet connection pipe connected to one side of the outer pipe of the heat exchange pipe and an outlet connection pipe connected to another side of the outer pipe of the heat exchange pipe may be connected to an intermediate portion of the 1-2-th inner refrigerant channel. The second inner refrigerant channel of the refrigerant multi-channel plate may be a 2-1-th inner refrigerant channel configured to provide a path guiding the refrigerant discharged from the evaporation core to be sucked into the accumulator, and may provide a path guiding the refrigerant discharged from the accumulator to be sucked into the compressor via the inner pipe of the heat exchange pipe.

In accordance with another embodiment of the present invention, there is provided an integrated thermal management module including a refrigerant module configured to force a refrigerant to circulate through a compressor, a condensation core, an expansion valve, and an evaporation core, the refrigerating module including a refrigerant multi-channel plate, wherein the compressor and the expansion valve are disposed at one side of the refrigerant multi-channel plate, and the condensation core and the evaporation core are disposed at another side of the refrigerant multi-channel plate, and wherein the refrigerant multi-channel plate is formed therein with a first inner refrigerant channel configured to provide a path guiding the refrigerant discharged from the condensation core to be sucked into the expansion valve, and a second inner refrigerant channel configured to provide a path guiding the refrigerant discharged from the evaporation core to be sucked into the compressor, and a coolant module including a coolant multi-channel plate formed with an inner coolant channel, wherein the condensation core and the evaporation core of the refrigerant module, an air conditioning core of an indoor air conditioner, an electrical part, a radiator, and a battery are interconnected via the inner coolant channel while being connected to the coolant multi-channel plate via a plurality of separate coolant connection lines connected to the coolant multi-channel plate.

The refrigerant multi-channel plate may be formed with a compressor inlet and a compressor outlet coupled to the compressor, a condensation core inlet and a condensation core outlet coupled to the condensation core, an expansion valve inlet and an expansion valve outlet coupled to the expansion valve, and an evaporation core inlet and an evaporation core outlet coupled to the evaporation core.

The compressor outlet and the condensation core inlet may be formed at opposite surfaces of the refrigerant multi-channel plate, respectively, to communicate with each other, thereby causing the compressor and the condensation core to be directly interconnected via the refrigerant multi-channel plate. The expansion valve outlet and the evaporation core inlet may be formed at the opposite surfaces of the refrigerant multi-channel plate, respectively, to communicate with each other, thereby causing the expansion valve and the evaporation core to be directly interconnected via the refrigerant multi-channel plate.

The refrigerant module may further include a heat exchange pipe formed to have a double pipe structure having an inner pipe and an outer pipe. The inner pipe may be connected, at one end thereof, to the second inner refrigerant channel while being connected, at another end thereof, to the compressor such that the refrigerant discharged from the evaporation core flows through the heat exchange pipe. The outer pipe may be connected, at opposite sides thereof, to the first inner refrigerant channel such that the refrigerant discharged from the condensation core flows through the outer pipe and exchanges heat with the refrigerant flowing through the inner pipe.

The refrigerant multi-channel plate may be formed with a compressor inlet and a compressor outlet coupled to the compressor, a condensation core inlet and a condensation core outlet coupled to the condensation core, an expansion valve inlet and an expansion valve outlet coupled to the expansion valve, and an evaporation core inlet and an evaporation core outlet coupled to the evaporation core. The compressor outlet and the condensation core inlet may be formed at opposite surfaces of the refrigerant multi-channel plate, respectively, to communicate with each other, thereby directly interconnecting the compressor and the condensation core. The condensation core outlet and the expansion valve inlet may be interconnected by the first inner refrigerant channel and the outer pipe of the heat exchange pipe. The expansion valve outlet and the evaporation core inlet may be formed at the opposite surfaces of the refrigerant multi-channel plate, respectively, to communicate with each other, thereby directly interconnecting the expansion valve and the evaporation core. The evaporation core outlet may be connected to the inner pipe of the heat exchange pipe via the second inner refrigerant channel. The compressor inlet and the inner pipe of the heat exchange pipe may be disposed at the opposite surfaces of the refrigerant multi-channel plate, respectively, to communicate with each other, thereby directly interconnecting the compressor and the inner pipe of the heat exchange pipe.

The coolant multi-channel plate may include a first coolant multi-channel plate formed with a first inner coolant channel guiding a coolant cooled through heat exchange in the evaporation core to flow therethrough, and a second inner coolant channel guiding a coolant heated through heat exchange in the condensation core to flow therethrough. The second inner coolant channel may be independent from the first inner coolant channel.

Each of the first coolant multi-channel plate and the second coolant multi-channel plate may be formed to have a plate shape. The first coolant multi-channel plate and the second coolant multi-channel plate may be disposed such that one surface of the first coolant multi-channel plate and one surface of the second coolant multi-channel plate are spaced apart from each other by a predetermined distance while facing each other.

The first coolant multi-channel plate may be formed with at least one first coolant inlet connector connected to the first inner coolant channel. The second coolant multi-channel plate may be formed with at least one second coolant outlet connector connected to the second inner coolant channel. A coolant may circulate between the first coolant multi-channel plate and the second coolant multi-channel plate through interconnection of the first coolant inlet connector and the second coolant outlet connector.

The first coolant inlet connector may protrude from the one surface of the first coolant multi-channel plate. The second coolant outlet connector may protrude from the one surface of the second coolant multi-channel plate. The first coolant inlet connector and the second coolant outlet connector may be interconnected while directly contacting each other.

A plurality of pumps and a plurality of valves may be provided at the first inner coolant channel of the first coolant multi-channel plate and the second inner coolant channel of the second coolant multi-channel plate.

The plurality of pumps and the plurality of valves may be installed at another surface of the first coolant multi-channel plate and another surface of the second coolant multi-channel plate.

A plurality of pump installation grooves and a plurality of valve installation grooves may be formed at the other surface of the first coolant multi-channel plate and the other surface of the second coolant multi-channel plate, to be formed to have a concave shape while communicating with the first inner coolant channel and the second inner coolant channel, such that each pump and each valve are installed in corresponding ones of the pump installation grooves and the valve installation grooves, respectively, in such a manner that portions of the pump and the valve are inserted into the corresponding pump installation groove and the corresponding valve installation groove, respectively.

An insulator may be disposed between the one surface of the first coolant multi-channel plate and the one surface of the second coolant multi-channel plate. An insulator may be disposed between another surface of the first coolant multi-channel plate and another surface of the second coolant multi-channel plate.

The radiator may include a first radiator connected to the battery and a second radiator connected to the air conditioning core of the indoor air conditioner and the electrical part. The air conditioning core of the indoor air conditioner may include a cold core. The first coolant multi-channel plate may be formed with a first radiator inlet and a first radiator outlet connected to the first radiator, a second radiator inlet and a second radiator outlet connected to the second radiator, an electrical part inlet and an electrical part outlet connected to the electrical part, an evaporation core coolant inlet and an evaporation core coolant outlet connected to the evaporation core of the refrigerant module, and a cold core inlet and a cold core outlet connected to the cold core.

The radiator may include a third radiator connected to the air conditioning core of the indoor air conditioner and the battery. The air conditioning core of the indoor air conditioner may include a water heater and a hot core. The second coolant multi-channel plate may be formed with a third radiator inlet and a third radiator outlet connected to the third radiator, a condensation core coolant inlet and a condensation core coolant outlet connected to the condensation core of the refrigerant module, a water heater inlet and a water heater outlet connected to the water heater, a hot core inlet and a hot core outlet connected to the hot core, and a battery inlet and a battery outlet connected to the battery.

The refrigerant multi-channel plate may be formed to have a plate shape, and may be disposed to be spaced apart from another surface of the second coolant multi-channel plate by a predetermined distance while facing the other surface of the second coolant multi-channel plate. The condensation core and the evaporation core may be disposed between the refrigerant multi-channel plate and the second coolant multi-channel plate.

The coolant circulating in the first coolant multi-channel plate may exchange heat with the refrigerant flowing in the evaporation core of the refrigerant module while flowing in the evaporation core. The coolant circulating in the second coolant multi-channel plate may exchange heat with the refrigerant flowing in the condensation core of the refrigerant module while flowing in the condensation core.

A receiver dryer configured to separate the refrigerant discharged from the condensation core into a liquid-phase refrigerant and a gas-phase refrigerant and to discharge the gas-phase refrigerant into the expansion valve, and an accumulator configured to separate the refrigerant discharged from the evaporation core into a liquid-phase refrigerant and a gas-phase refrigerant and to discharge the gas-phase refrigerant into the compressor may be further disposed at the one side of the refrigerant multi-channel plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
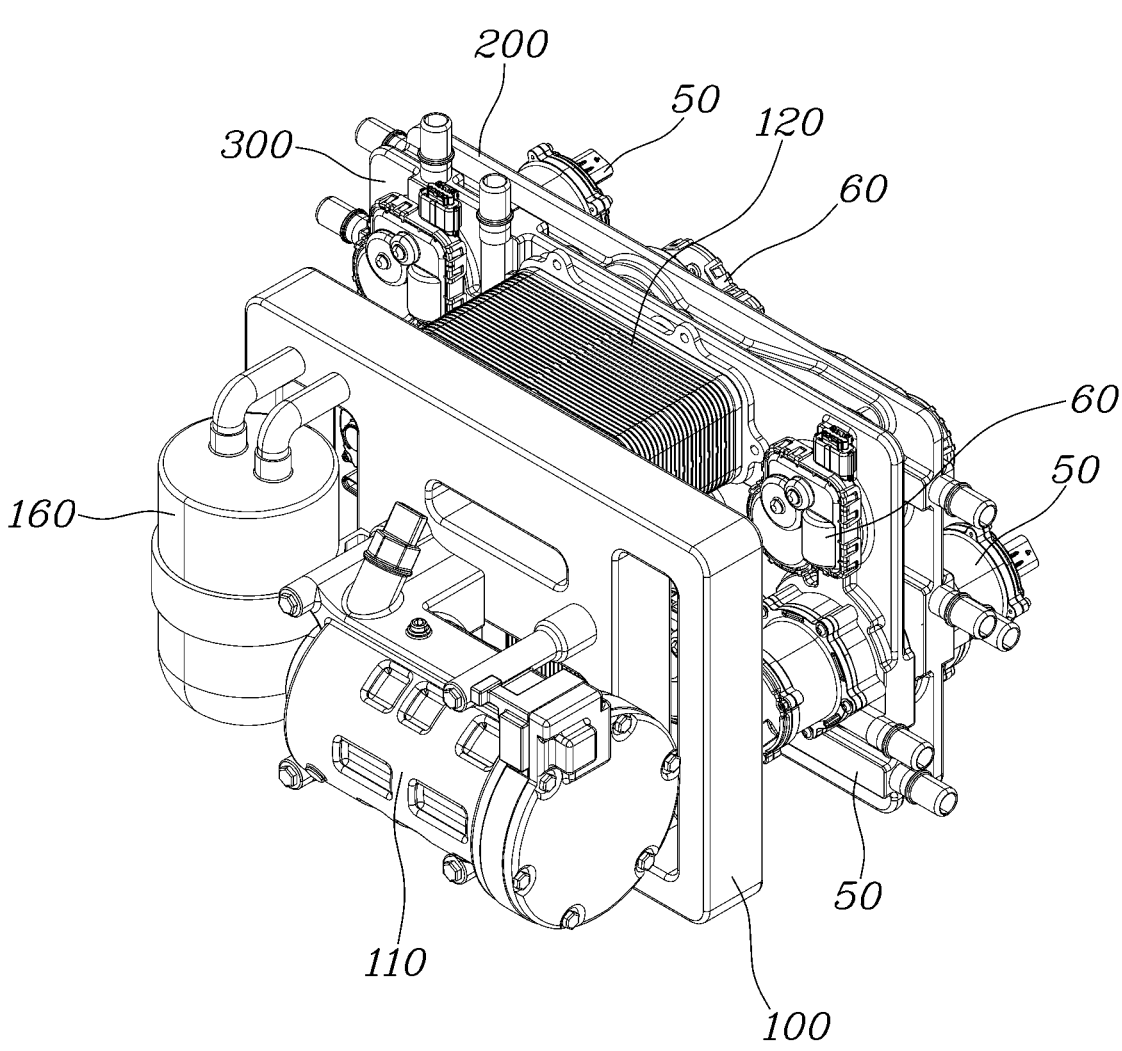
FIG. 1 shows a perspective view of a refrigerant module and a coolant module applied to an integrated thermal management module for a vehicle according to an exemplary embodiment of the present invention.

Hereinafter, exemplary embodiments of the present invention will be described in detail with reference to the accompanying drawings. However, the present invention is not limited to a variety of embodiments described below and can be implemented in various forms. The embodiments of the present invention are provided only to completely disclose the present invention and fully inform a person having ordinary knowledge in the field to which the present invention pertains of the scope of the present invention. In the drawings, the same reference numerals designate the same elements.

Figure 2:
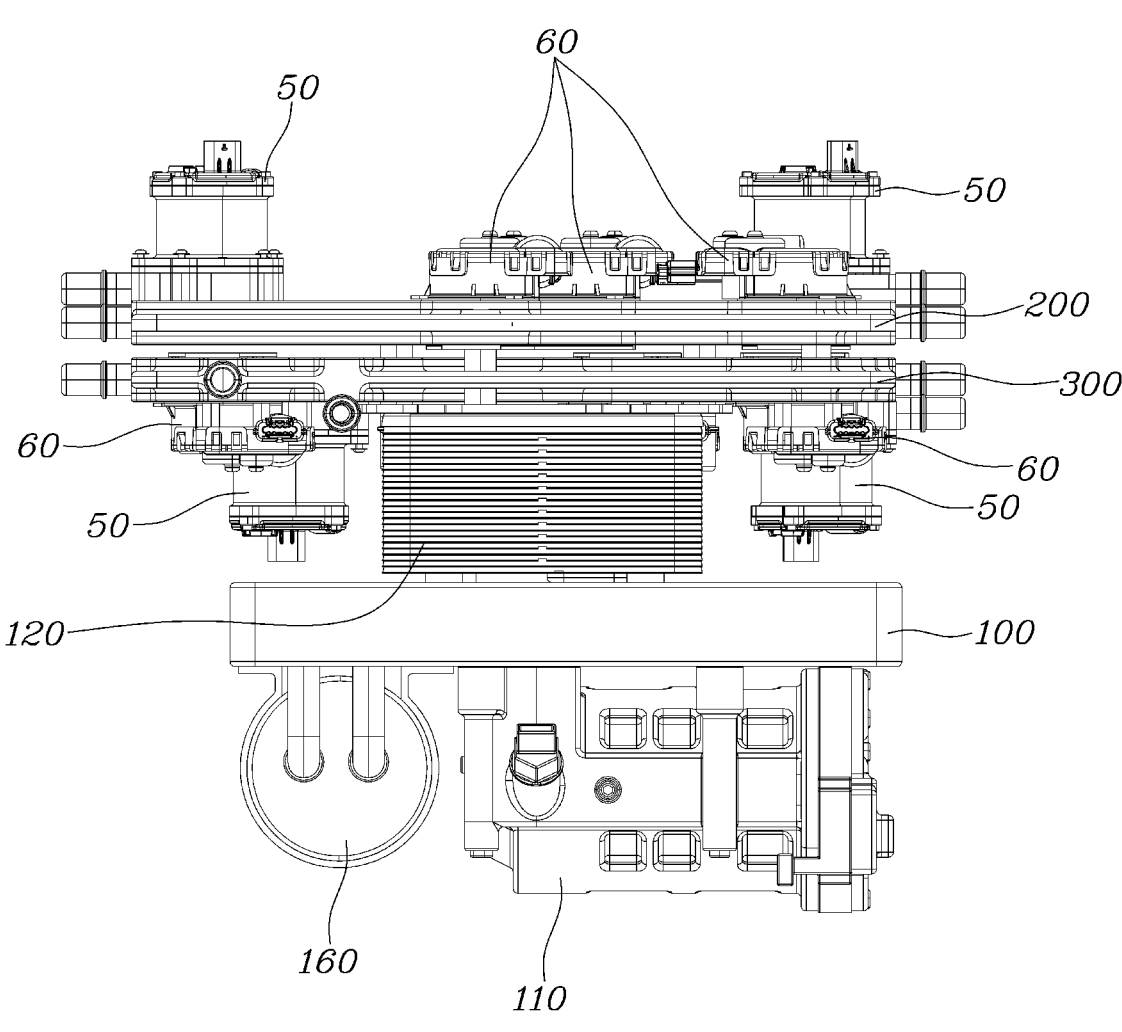
FIG. 2 shows a plan view of the refrigerant module and the coolant module applied to the integrated thermal management module according to the exemplary embodiment of the present invention.
Figure 3:
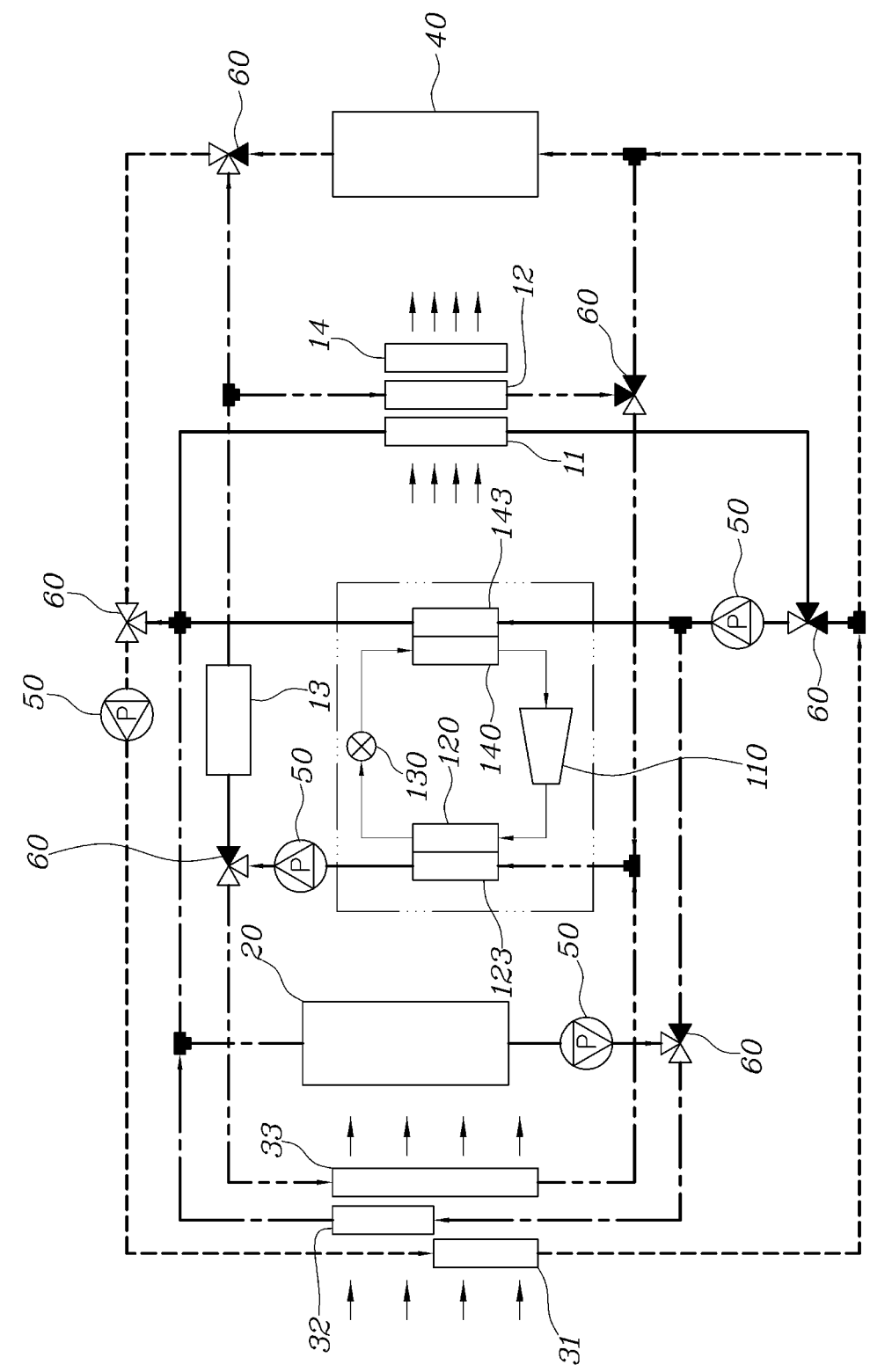
FIG. 3 shows a cooling/heating circuit of the vehicle to which the integrated thermal management module according to the exemplary embodiment of the present invention is applied.
Figure 4A:
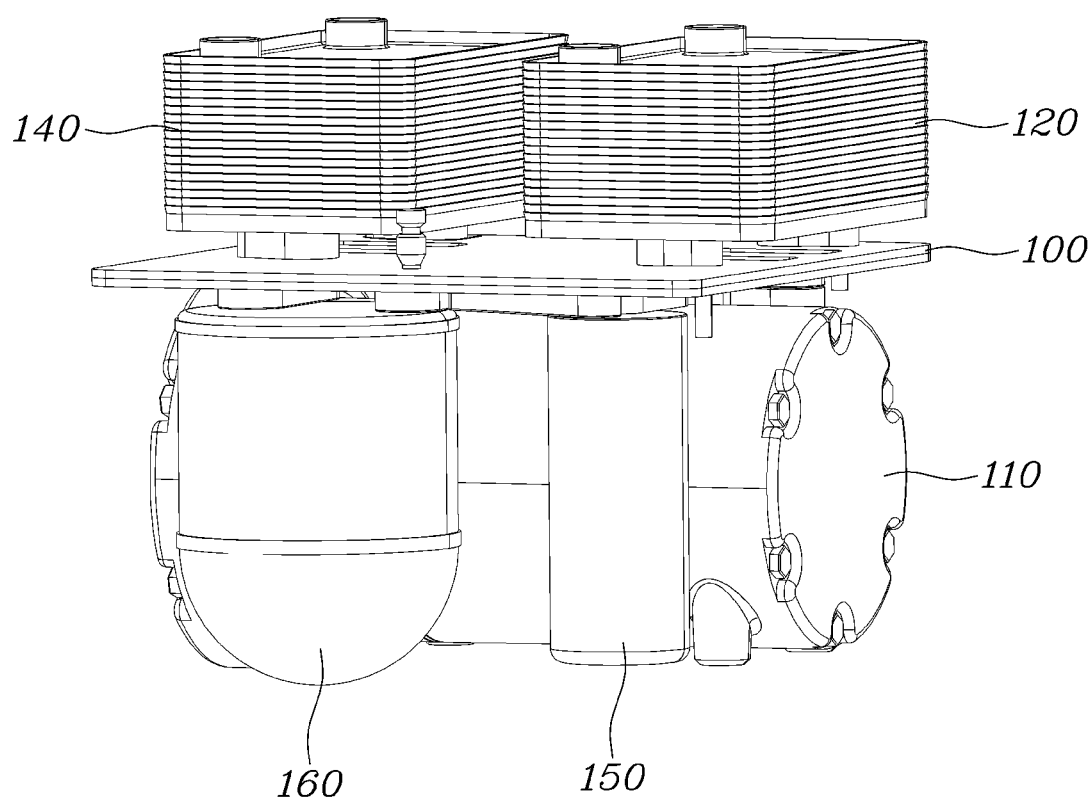
FIGS. 4A to 4D show a refrigerant module of an integrated thermal management module for a vehicle according to an exemplary embodiment of the present invention.
Figure 4B:
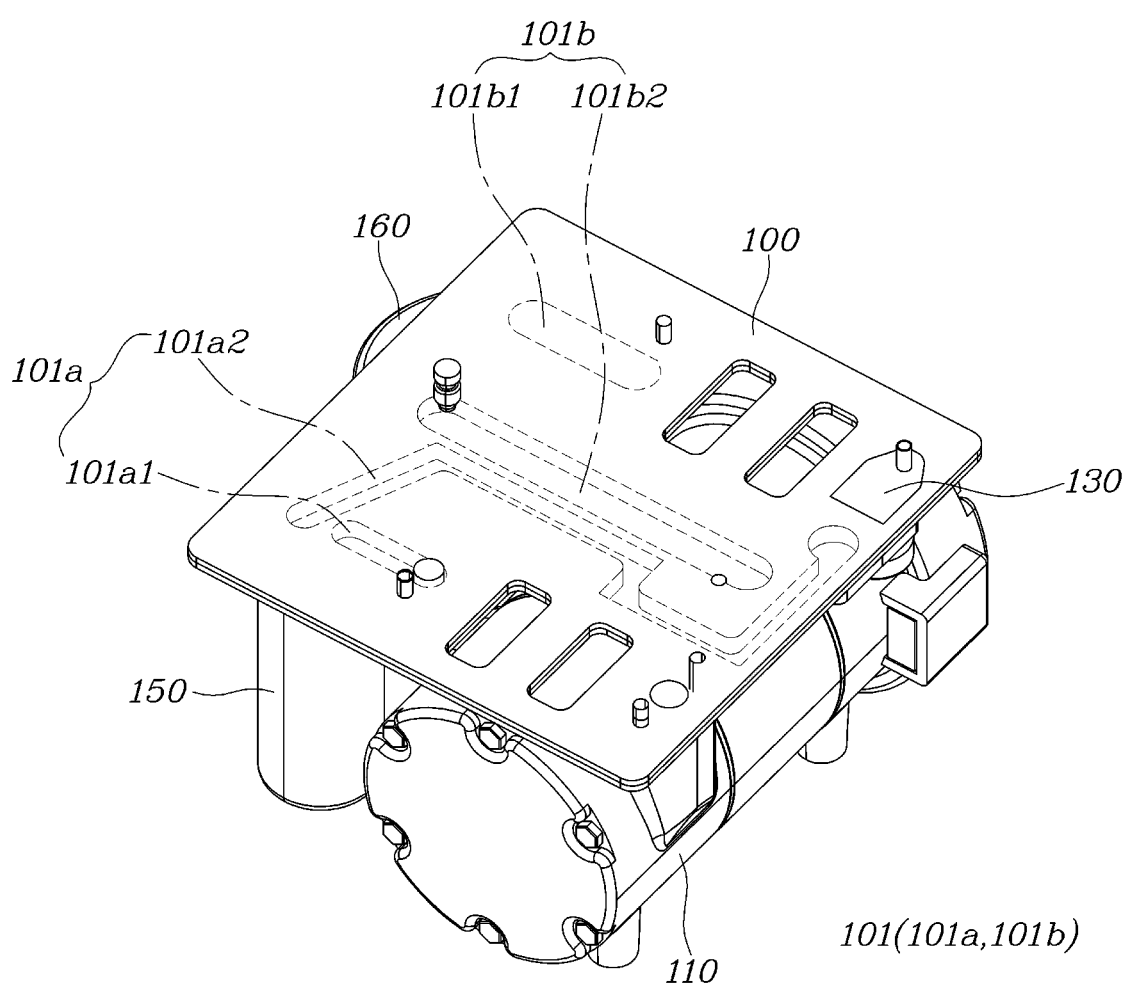
Figure 4C:
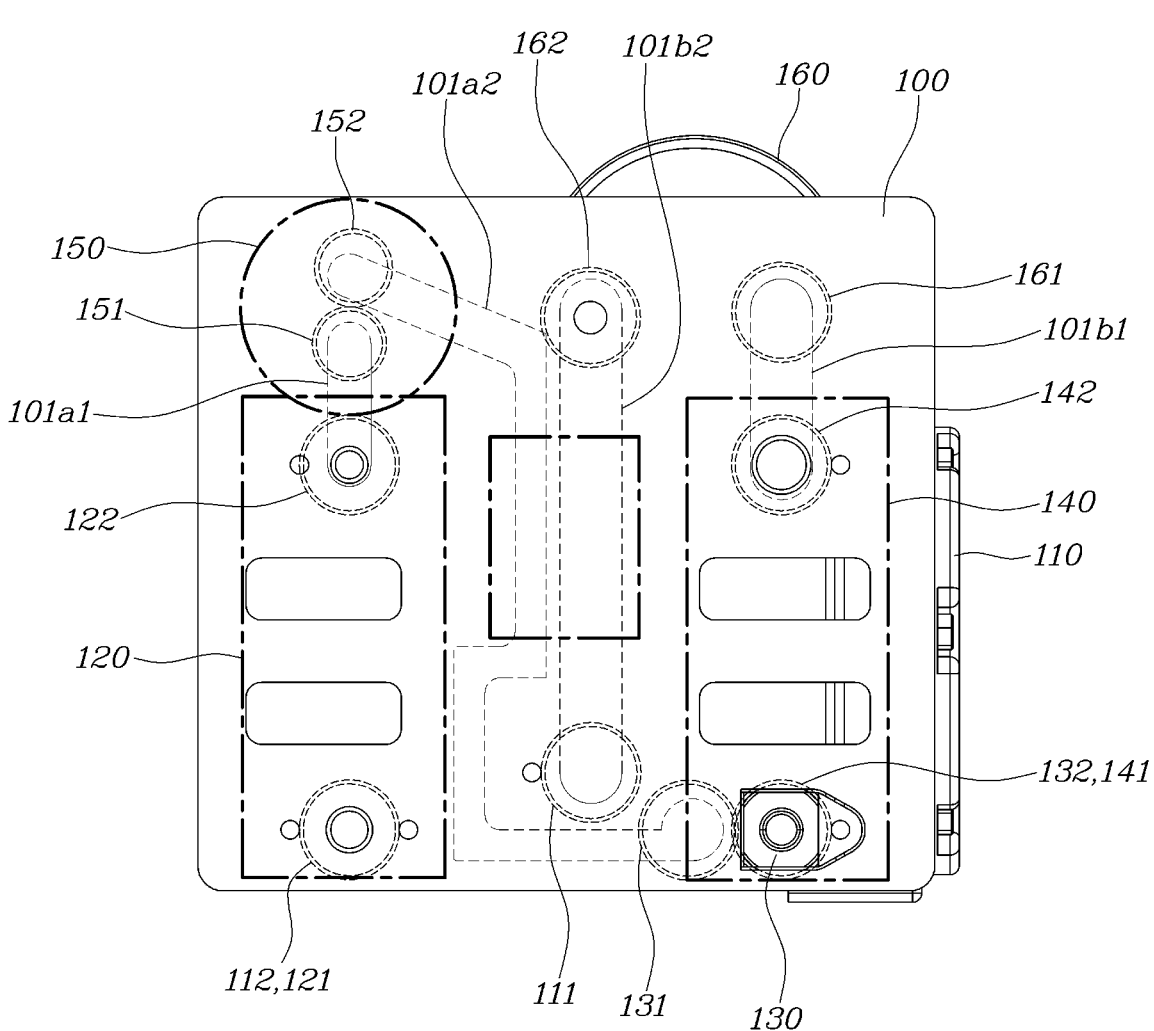
Figure 4D:
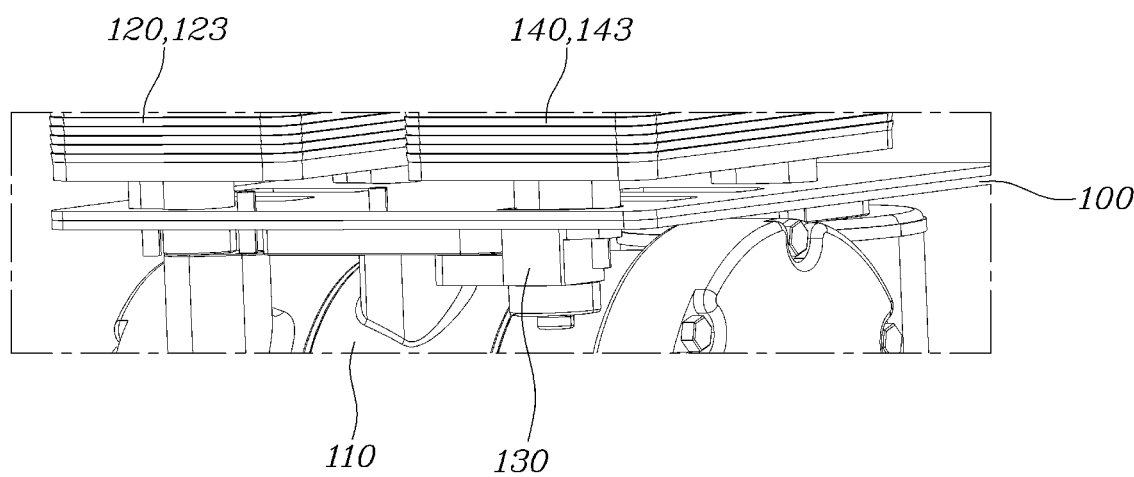

FIG. 1 is a perspective view showing a refrigerant module and a coolant module applied to an integrated thermal management module for a vehicle according to an exemplary embodiment of the present invention. FIG. 2 is a plan view showing the refrigerant module and the coolant module applied to the integrated thermal management module according to the exemplary embodiment of the present invention. FIG. 3 is a circuit diagram showing a cooling/heating circuit of the vehicle to which the integrated thermal management module according to the exemplary embodiment of the present invention is applied.

As shown in the drawings, the integrated thermal management module according to the exemplary embodiment of the present invention is configured through integration of the refrigerant module, through which a refrigerant circulates, and the coolant module, through which a coolant circulates, such that heat exchange is performed between the refrigerant and the coolant.

The refrigerant module is a module constituting a circuit though which a refrigerant circulates, and is configured by connecting a compressor 110, a condensation core 120, an expansion valve 130, and an evaporation core 140, through which a refrigerant circulates, to a refrigerant multi-channel plate 100 formed with an inner refrigerant channel 101. In addition, one or both of a receiver dryer 150 and an accumulator 160 may be further connected to the refrigerant module. Accordingly, as the refrigerant flows through the inner refrigerant channel 101 formed in the refrigerant multi-channel plate 100, the refrigerant is compressed in the compressor 110, exchanges heat with a coolant in the condensation core 120 after flowing into the condensation core 120, and is then introduced into the receiver dryer 150. In the receiver dryer 150, the refrigerant is separated into a gas-phase refrigerant and a liquid-phase refrigerant. The liquid-phase refrigerant is forced to flow to the expansion valve 130. The refrigerant introduced into the expansion valve 130 flows to the evaporation core 140 after being expanded and, as such, exchanges heat with the coolant in the evaporation core 140, and then enters the accumulator 160. In the accumulator 160, the refrigerant is separated into a gas-phase refrigerant and a liquid-phase refrigerant. The gas-phase refrigerant is forced to flow to the compressor 110.

Of course, the embodiment of FIG. 1 is an embodiment in which only one of the receiver dryer 150 and the accumulator 160 is installed. Accordingly, the refrigerant, which has been subjected to heat exchange in the condensation core 120, flows to the expansion valve 130 through the refrigerant multi-channel plate 100.

As such, the refrigerant heats or cools the coolant through heat exchange thereof with the coolant while sequentially circulating through the compressor 110, the condensation core 120, the expansion valve 130, the evaporation core 140, and the accumulator 160 or sequentially circulating through the compressor 110, the condensation core 120, the receiver dryer 150, the expansion valve 130, the evaporation core 140, and the accumulator 160.

Meanwhile, the coolant module is a module constituting a circuit through which a coolant circulates, and is configured by connecting the condensation core 120 and the evaporation core 140 of the refrigerant module, an air conditioning core of an indoor air conditioner, an electrical part 20, radiators 31, 32, and 33, and a battery 40 to coolant multi-channel plates 200 and 300 respectively formed with inner coolant channels 201 and 301 via a plurality of coolant connection lines. Accordingly, the coolant flows through and exchanges heat with the condensation core 120 and the evaporation core 140 of the refrigerant module, air conditioning cores 11, 12, 13, and 14 of the indoor air conditioner, the electrical part 20, the radiators 31, 32, and 33, and the battery 40 while passing through the inner coolant channels 201 and 301 formed in the coolant multi-channel plates 200 and 300.

In particular, in this embodiment, the coolant multi-channel plates 200 and 300 include, in a divided manner, a first coolant multi-channel plate 200 formed with a first inner coolant channel 201, through which a coolant cooled through heat exchange thereof in the evaporation core 140 of the refrigerant module flows, and a second inner coolant channel 301, through which a coolant heated through heat exchange thereof in the condensation core 120 of the refrigerant module flows. Although the first coolant multi-channel plate 200 and the second coolant multi-channel plate 300 are independently provided in this case, it is preferred that the first coolant multi-channel plate 200 and the second coolant multi-channel plate 300 be interconnected such that a coolant flows therebetween.

In addition, in this embodiment, the radiators 31, 32, and 33 include, in a divided manner, a first radiator 31 connected to the battery 40, a second radiator 32 connected to the air conditioning cores 11, 12, 13, and 14 of the indoor air conditioner and the electrical part 20, and a third radiator 33 connected to the air conditioning cores 11, 12, 13, and 14 of the indoor air conditioner and the battery 40.

In addition, the air conditioning cores 11, 12, 13, and 14 of the indoor air conditioner include a cold core 11, a hot core 12, a water heater 13, and an air heater 14.

In addition, the evaporation core 140 of the refrigerant module includes a first chiller 143 through which the coolant circulating in the first coolant multi-channel plate 200 flows. Accordingly, the coolant flowing in the first chiller 143 exchanges heat with the refrigerant flowing in the evaporation core 140. In addition, the condensation core 120 of the refrigerant module includes a second chiller 123 through which the coolant circulating in the second coolant multi-channel plate 300 flows. Accordingly, the coolant flowing in the second chiller 123 exchanges heat with the refrigerant flowing in the condensation core 120.

The cooling/heating circuit, to which the integrated thermal management module according to the exemplary embodiment of the present invention configured as described above is applied, will be described with reference to FIG. 3.

First, the refrigerant circulates only in the refrigerant module through the refrigerant multi-channel plate 100. That is, the refrigerant circulates in the refrigerant module while sequentially passing through the compressor 110, the condensation core 120, the expansion valve 130, and the evaporation core 140. In this case, in the evaporation core 140, the refrigerant exchanges heat with the coolant flowing in the first chiller 143, thereby cooling the coolant. Meanwhile, in the condensation core 120, the refrigerant exchanges heat with the coolant flowing in the second chiller 123, thereby heating the coolant.

On the other hand, the coolant circulates in a state of being divided into cooled coolant and heated coolant.

The cooled coolant circulates through the first coolant multi-channel plate 200 constituting the coolant module. This coolant is cooled while passing through the first chiller 143 performing heat exchange in the evaporation core 140 of the refrigerant module and one of the first radiator 31 and the second radiator 32, and cools the cold core 11 of the air conditioning core constituting the indoor air conditioner, the electrical part 20 or the battery 40 while passing through the cold core 11, the electrical part 20 or the battery 40.

In addition, the heated coolant circulates through the second coolant multi-channel plate 300 constituting the coolant module. This coolant is heated while passing through the second chiller 123 performing heat exchange in the condensation core 120 of the refrigerant module, and heats the hot core 12 of the air conditioning core constituting the indoor air conditioner or the battery 40 while passing through the hot core 12 or the battery 40 in a state of being adjusted in temperature while passing through the third radiator 33 or the water heater 13. When it is desired to further increase the temperature of the heated coolant passing through the hot core 12, the air heater 14 may further operate.

Meanwhile, an integrated thermal management module in which a refrigerant module and a coolant module as shown in FIGS. 1 and 2 are integrated is proposed in order to achieve compactness of a complex circuit as the cooling/heating circuit of FIG. 3.

First, the refrigerant module will be described.

FIGS. 4A to 4D are views showing a refrigerant module of an integrated thermal management module for a vehicle according to an exemplary embodiment of the present invention. The embodiment of FIGS. 4A to 4D is an embodiment in which both a receiver dryer 150 and an accumulator 160 are connected to a refrigerant multi-channel plate 100.

As described above, the refrigerant module is a module constituting a circuit through which a refrigerant circulates. In the refrigerant module, circulation of the refrigerant is achieved by connecting a compressor 110, a condensation core 120, an expansion valve 130, an evaporation core 140, the receiver dryer 150, and the accumulator 160 to the refrigerant multi-channel plate 100 in which an inner refrigerant channel 101 is formed.

Here, the compressor 110, the condensation core 120, the expansion valve 130, the evaporation core 140, the receiver dryer 150, and the accumulator 160 may be configured in various forms enabling the parts associated therewith to perform desired functions. In particular, the compressor 110, the condensation core 120, the expansion valve 130, the evaporation core 140, the receiver dryer 150, and the accumulator 160 may have any inner configurations, so long as the inner configurations can perform desired functions.

In this embodiment, however, compactness of the refrigerant module is achieved by limitedly designing an inner refrigerant channel 101 formed in a refrigerant multi-channel plate 100 while improving disposition relations and connection relations of the compressor 110, the condensation core 120, the expansion valve 130, the evaporation core 140, the receiver dryer 150, and the accumulator 160 connected to the refrigerant multi-channel plate 100.

In detail, the refrigerant multi-channel plate 100 is formed to have a plate shape and, as such, the compressor 110 and the expansion valve 130 are disposed at one side of the refrigerant multi-channel plate 100, and the condensation core 120 and the evaporation core 140 are disposed at the other side of the refrigerant multi-channel plate 100. In addition, the receiver dryer 150 and the accumulator 160 are disposed at the one side of the refrigerant multi-channel plate 100, that is, in the same direction as that of the compressor 110 and the expansion valve 130.

Accordingly, the inner refrigerant channel 101 formed in the refrigerant multi-channel plate 100 is designed such that a refrigerant flows in the inner refrigerant channel 101 while sequentially passing through the compressor 110, the condensation core 120, the receiver dryer 150, the expansion valve 130, and the evaporation core 140.

In addition, a plurality of inlets and a plurality of outlets, which are connected to the inner refrigerant channel 101, are formed at the refrigerant multi-channel plate 100 in order to enable the compressor 110, the condensation core 120, the expansion valve 130, the evaporation core 140, and the accumulator 160 to be directly connected to the refrigerant multi-channel plate 100.

In detail, the refrigerant multi-channel plate 100 is formed to have a plate shape, and is formed with the inner refrigerant channel 101 therein. For example, the refrigerant multi-channel plate 100 is formed by welding two panels in a state in which the panels face each other. In this case, the refrigerant multi-channel plate 100 may be manufactured by forming an inner refrigerant channel 101 having a concave shape at one or both of the two panels, and welding channel-formed surfaces of the panels in a state in which the surfaces face each other.

Meanwhile, at the refrigerant multi-channel plate 100, a compressor inlet 111 and a compressor outlet 112, to which the compressor 110 is coupled, and a condensation core inlet 121 and a condensation core outlet 122, to which the condensation core 120 is coupled, are formed. In addition, at the refrigerant multi-channel plate 100, an expansion valve inlet 131 and an expansion valve outlet 132, to which the expansion valve 130 is coupled, and an evaporation core inlet 141 and an evaporation core outlet 142, to which the evaporation core 140 is coupled, are formed. In addition, at the refrigerant multi-channel plate 100, a receiver dryer inlet 151 and a receiver dryer outlet 152, to which the receiver dryer 150 is coupled, and an accumulator inlet 161 and an accumulator outlet 162, to which the accumulator 160 is coupled, are formed.

Meanwhile, the inner refrigerant channel 101 formed in the refrigerant multi-channel plate 100 is divided into a first inner refrigerant channel 101a configured to provide a path through which a refrigerant discharged from the condensation core 120 is sucked into the expansion valve 130, and a second inner refrigerant channel 101b configured to provide a path through which a refrigerant discharged from the evaporation core 140 is sucked into the compressor 110.

In more detail, the first inner refrigerant channel 101a is divided into a 1-1-th inner refrigerant channel 101a1 configured to provide a path through which the refrigerant discharged from the condensation core 120 is sucked into the receiver dryer 150, and a 1-2-th inner refrigerant channel 101a2 configured to provide a path through which a refrigerant discharged from the receiver dryer 150 is sucked into the expansion valve 130.

In addition, the second inner refrigerant channel 101b is divided into a 2-1-th inner refrigerant channel 101b1 configured to provide a path through which the refrigerant discharged from the evaporation core 140 is sucked into the accumulator 160, and a 2-2-th inner refrigerant channel 101b2 configured to provide a path through which a refrigerant discharged from the accumulator 160 is sucked into the compressor 110.

The compressor outlet 112 and the condensation core inlet 121 are formed at opposite surfaces of the refrigerant multi-channel plate 100, respectively, and, as such, communicate with each other. Accordingly, as the compressor 110 is coupled to the compressor outlet 112, and the condensation core 120 is coupled to the condensation core inlet 121, the compressor 110 and the condensation core 120 are directly connected to each other via the refrigerant multi-channel plate 100.

In addition, the expansion valve outlet 132 and the evaporation core inlet 141 are formed at the opposite surfaces of the refrigerant multi-channel plate 100, respectively, and, as such, communicate with each other. Accordingly, as the expansion valve 130 is coupled to the expansion valve outlet 132, and the evaporation core 140 is coupled to the evaporation core inlet 141, the expansion valve 130 and evaporation core 140 are directly connected to each other via the refrigerant multi-channel plate 100.

Meanwhile, the condensation core outlet 122 and the expansion valve inlet 131 are interconnected by the first inner refrigerant channel 101*a*. In more detail, the condensation core outlet 122 and the receiver dryer inlet 151 are interconnected by the 1-1-th inner refrigerant channel 101*a*1, and the receiver dryer outlet 152 and the expansion valve inlet 131 are interconnected by the 1-2-th inner refrigerant channel 101*a*2.

In addition, the evaporation core outlet 142 and the compressor inlet 111 are interconnected by the second inner refrigerant channel 101*b*. In more detail, the evaporation core outlet 142 and the accumulator inlet 161 are interconnected by the 2-1-th inner refrigerant channel 101*b*1, and the accumulator outlet 162 and the compressor inlet 111 are interconnected by the 2-1-th inner refrigerant channel 101*b*2.

In this case, the shape of the inner refrigerant channel 101 may be implemented to have various patterns capable of interconnecting at least the condensation core outlet 122 and the expansion valve inlet 131 and interconnecting at least the evaporation core outlet 142 and the compressor inlet 111, without being limited to the illustrated embodiment.

Next, the coolant module will be described.

Figure 5:
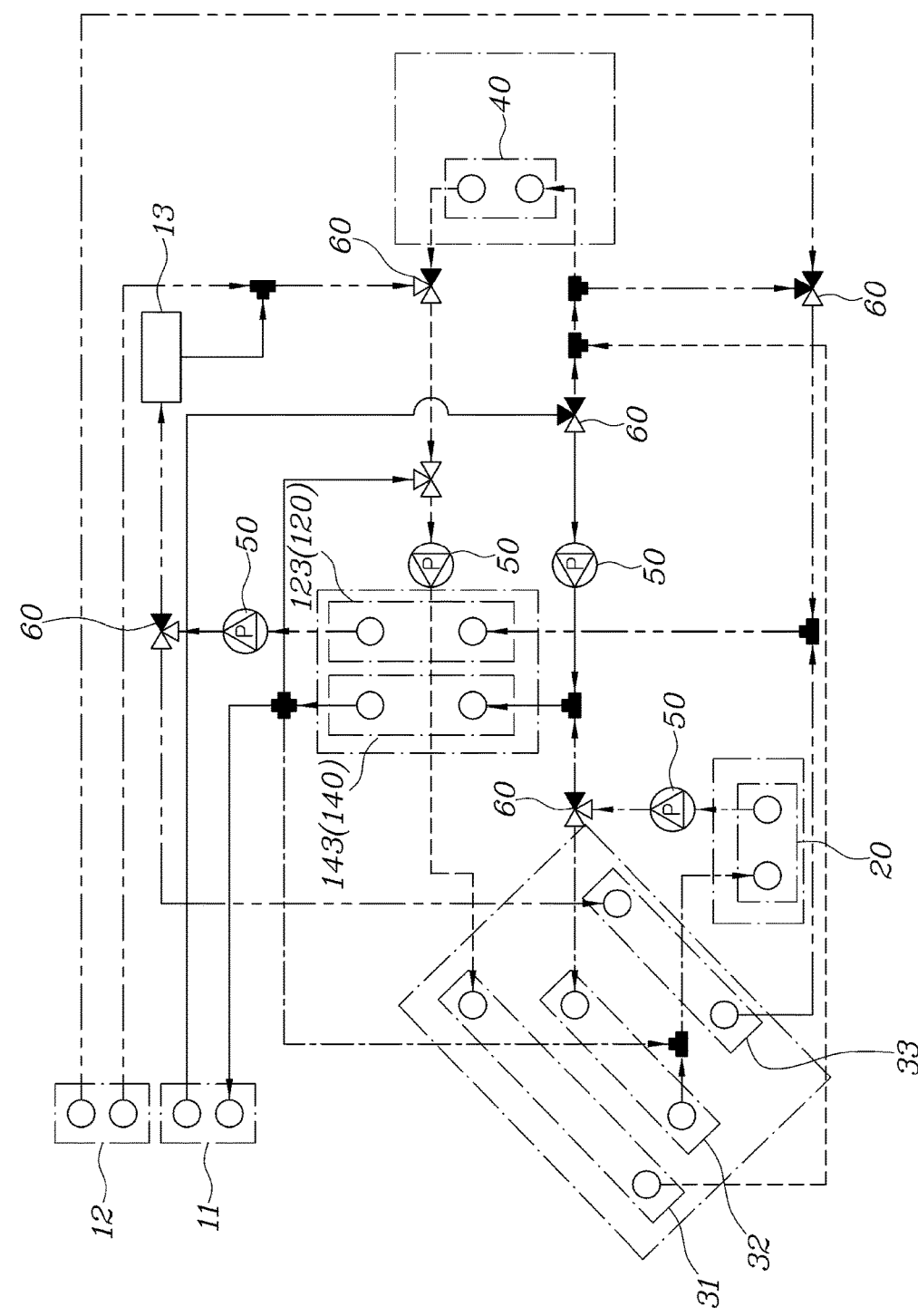
FIG. 5 shows a cooling/heating circuit of a coolant module applied to an integrated thermal management module for a vehicle according to an exemplary embodiment of the present invention.
Figure 6A:
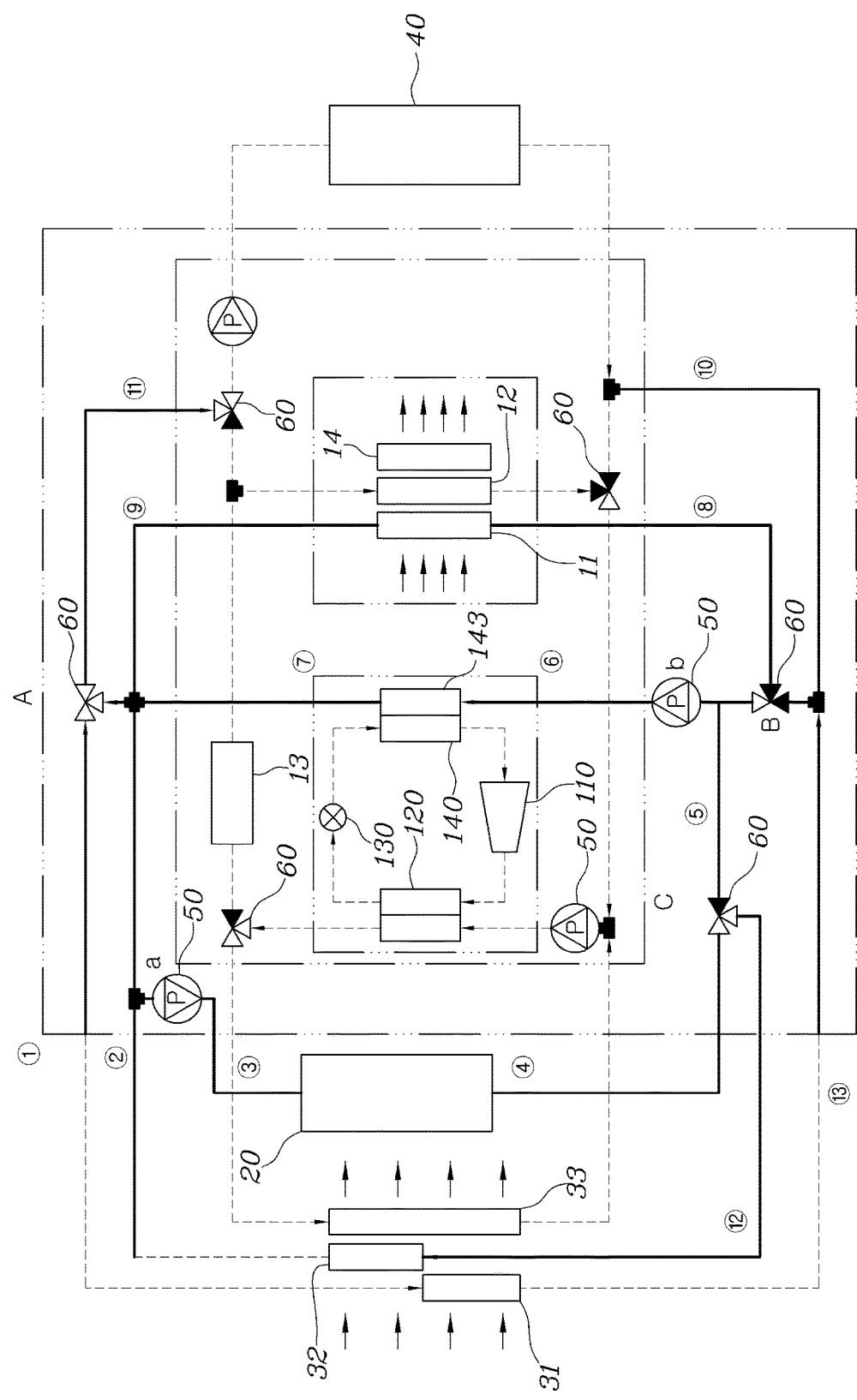
FIG. 6A shows a cooling/heating circuit of a first coolant multi-channel plate included in the coolant module applied to the integrated thermal management module according to the exemplary embodiment of the present invention.
Figure 6B:
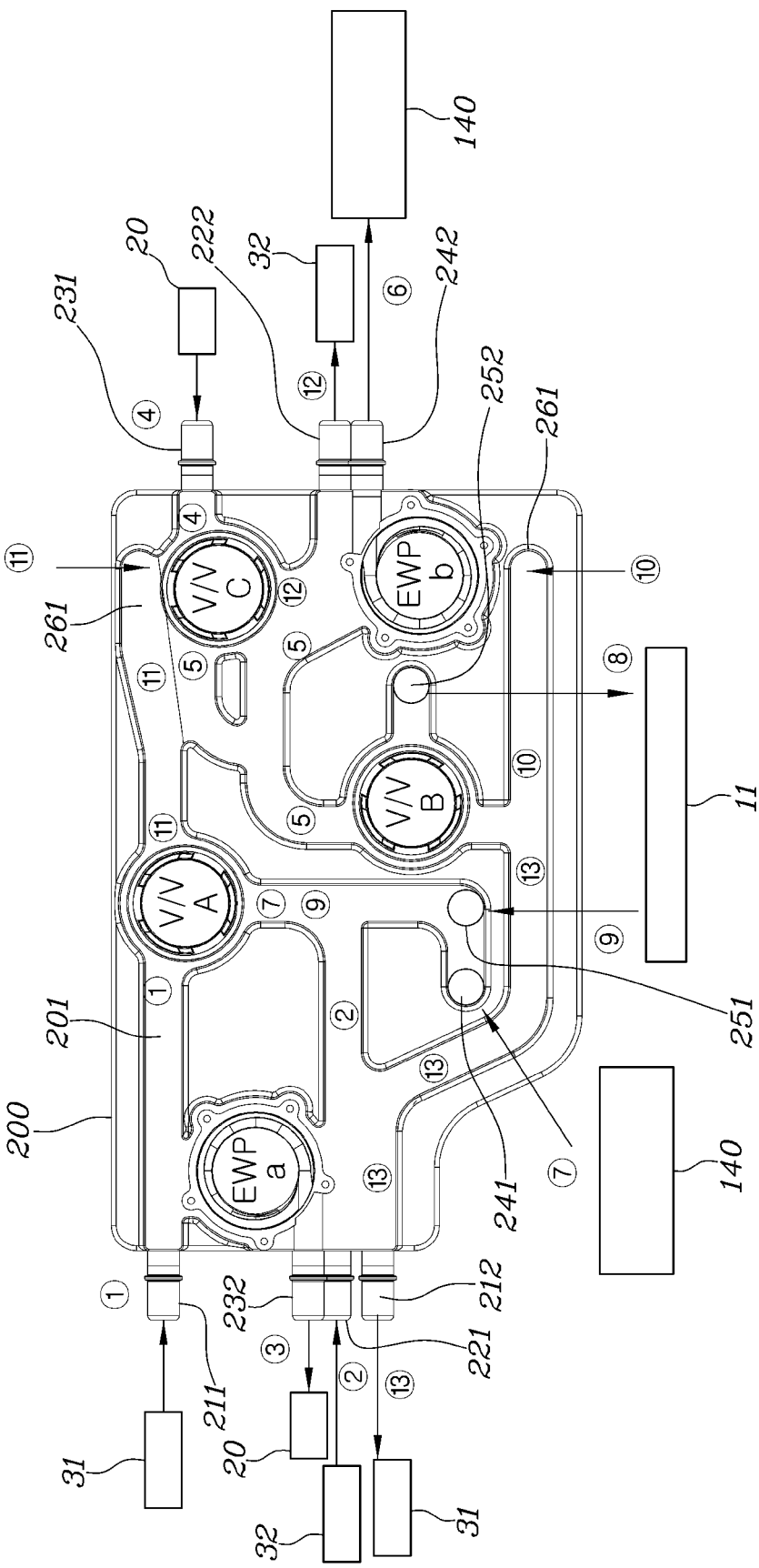
FIG. 6B shows the first coolant multi-channel plate included in the coolant module applied to the integrated thermal management module according to the exemplary embodiment of the present invention.
Figure 7A:
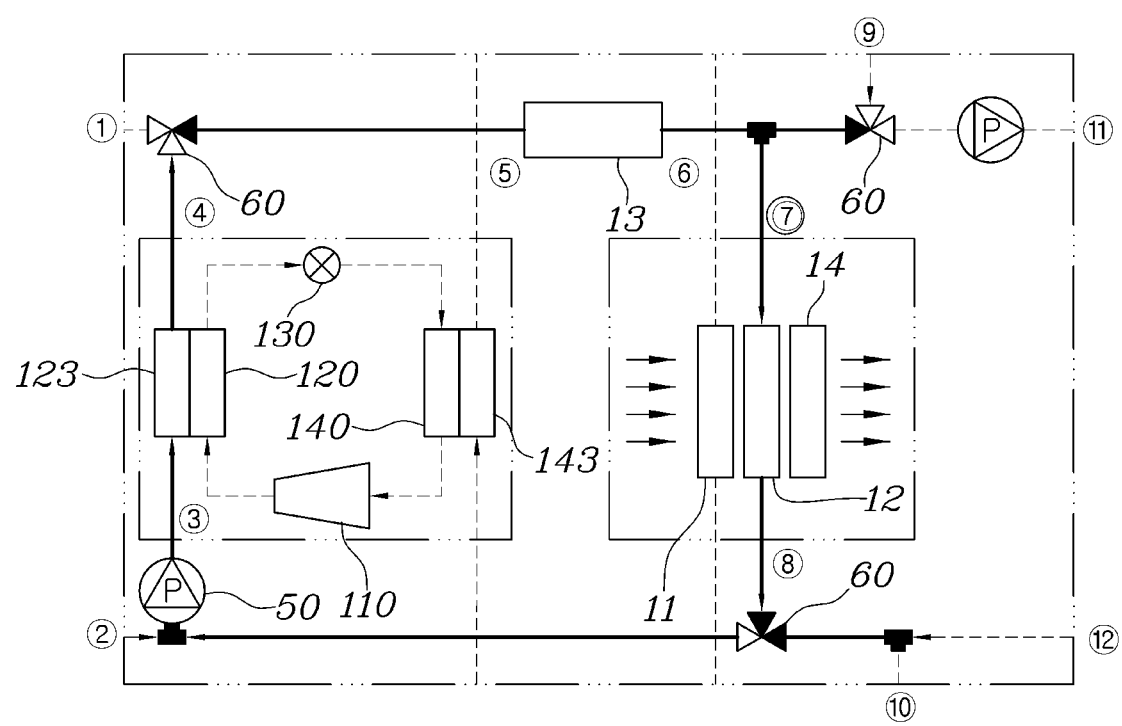
FIG. 7A shows a cooling/heating circuit of a second coolant multi-channel plate included in the coolant module applied to the integrated thermal management module according to the exemplary embodiment of the present invention.
Figure 7B:
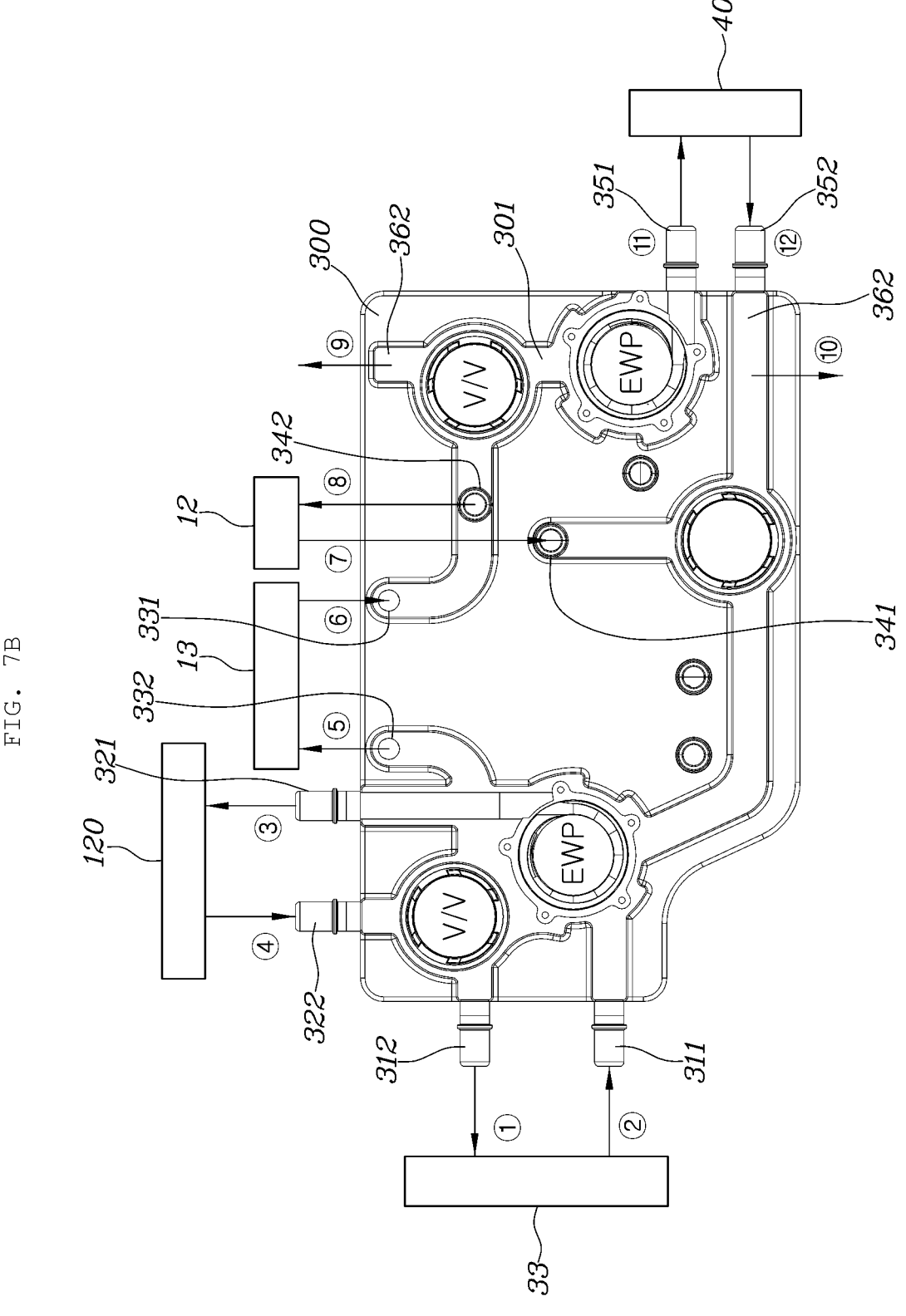
FIG. 7B shows the second coolant multi-channel plate included in the coolant module applied to the integrated thermal management module according to the exemplary embodiment of the present invention.

FIG. 5 is a circuit diagram showing a cooling/heating circuit of a coolant module applied to an integrated thermal management module for a vehicle according to an exemplary embodiment of the present invention. FIG. 6A is a circuit diagram showing a cooling/heating circuit of a first coolant multi-channel plate included in the coolant module applied to the integrated thermal management module according to the exemplary embodiment of the present invention. FIG. 6B is a circuit diagram showing the first coolant multi-channel plate included in the coolant module applied to the integrated thermal management module according to the exemplary embodiment of the present invention. FIG. 7A is a circuit diagram showing a cooling/heating circuit of a second coolant multi-channel plate included in the coolant module applied to the integrated thermal management module according to the exemplary embodiment of the present invention. FIG. 7B is a circuit diagram showing the second coolant multi-channel plate included in the coolant module applied to the integrated thermal management module according to the exemplary embodiment of the present invention.

As described above, the coolant module is a module constituting a circuit through which a coolant circulates. In the coolant module, circulation of the coolant is achieved by connecting a condensation core 120 and an evaporation core 140 of a refrigerant module, air conditioning cores 11, 12, 13, and 14 of an indoor air conditioner, an electrical part 20, radiators 31, 32, and 33, and a battery 40 to coolant multi-channel plates 200 and 300 respectively formed with inner coolant channels via a plurality of separate coolant connection lines.

In this case, the coolant multi-channel plates 200 and 300 include, in a divided manner, a first coolant multi-channel plate 200 configured to circulate a coolant for cooling purposes and a second coolant multi-channel plate 300 configured to circulate a coolant for heating purposes.

To this end, the first coolant multi-channel plate 200 is formed with a first inner coolant channel 201 through which a coolant cooled through heat exchange thereof in the evaporation core 140 of the refrigerant module flows. In addition, the second coolant multi-channel plate 300 is formed with a second inner coolant channel 301 through which a coolant heated through heat exchange thereof in the condensation core 120 of the refrigerant module flows.

In this case, a plurality of inlets and a plurality of outlets, which are connected to the first inner coolant channel 201, are formed at the first coolant multi-channel plate 200 in order to enable the first radiator 31, the second radiator 32, the electrical part 20, the evaporation core 140 of the refrigerant module or an air conditioning core of an indoor air conditioner to be directly connected to the first coolant multi-channel plate 200.

In detail, the first coolant multi-channel plate 200 is formed with a first radiator inlet 211 and a first radiator outlet 212, which are connected to the first radiator 31, and a second radiator inlet 221 and a second radiator outlet 222, which are connected to the second radiator 32. In addition, the first coolant multi-channel plate 200 is formed with an electrical part inlet 231 and an electrical part outlet 232, which are connected to the electrical part 20, and an evaporation core coolant inlet 241 and an evaporation core coolant outlet 242, which are connected to the evaporation core 140 of the refrigerant module. In addition, the first coolant multi-channel plate 200 is formed with a cold core inlet 251 and a cold core outlet 252, which are connected to the cold core 11.

In this case, the first inner coolant channel 201 interconnects the plurality of inlets and the plurality of outlets described above. In this case, the shape of the first inner coolant channel 201 is determined to interconnect the plurality of inlets and the plurality of outlets such that positions of circled numbers indicated in the circuit shown in FIG. 6A and positions of circled numbers indicated in the first coolant multi-channel plate 200 shown in FIG. 6B are matched. In this case, the shape of the first inner coolant channel 201 may be implemented to have various patterns capable of interconnecting the plurality of inlets and the plurality of outlets such that the positions of the circled numbers indicated in the circuit shown in FIG. 6A and the positions of the circled numbers indicated in the first coolant multi-channel plate 200 shown in FIG. 6B are matched, without being limited to the illustrated embodiment.

In addition, a plurality of inlets and a plurality of outlets, which are connected to the second inner coolant channel 301, are formed at the second coolant multi-channel plate 300 in order to enable the third radiator 33, the condensation core 120 of the refrigerant module, the water heater 13, the hot core 12 constituting the air conditioning core of the indoor air conditioner, or the battery 40 to be directly connected to the second coolant multi-channel plate 300.

In detail, the second coolant multi-channel plate 300 is formed with a third radiator inlet 311 and a third radiator outlet 312, which are connected to the third radiator 33, and a condensation core coolant inlet 321 and a condensation core coolant outlet 322, which are connected to the condensation core 120 of the refrigerant module. In addition, the second coolant multi-channel plate 300 is formed with a water heater inlet 331 and a water heater outlet 332, which are connected to the water heater 13, and a hot core inlet 341 and a hot core outlet 342, which are connected to the hot core 12. In addition, the second coolant multi-channel plate 300 is formed with a battery inlet 351 and a battery outlet 352, which are connected to the battery 40.

In this case, the second inner coolant channel 301 interconnects the plurality of inlets and the plurality of outlets described above. In this case, the shape of the second inner coolant channel 301 is determined to interconnect the plurality of inlets and the plurality of outlets such that positions of circled numbers indicated in the circuit shown in FIG. 7A and positions of circled numbers indicated in the second coolant multi-channel plate 300 shown in FIG. 7B are matched. In this case, the shape of the second inner coolant channel 301 may be implemented to have various patterns capable of interconnecting the plurality of inlets and the plurality of outlets such that the positions of the circled numbers indicated in the circuit shown in FIG. 7A and the positions of the circled numbers indicated in the second coolant multi-channel plate 300 shown in FIG. 7B are matched, without being limited to the illustrated embodiment.

Hereinafter, connection relation between the refrigerant module and the coolant module will be described.

Figure 8:
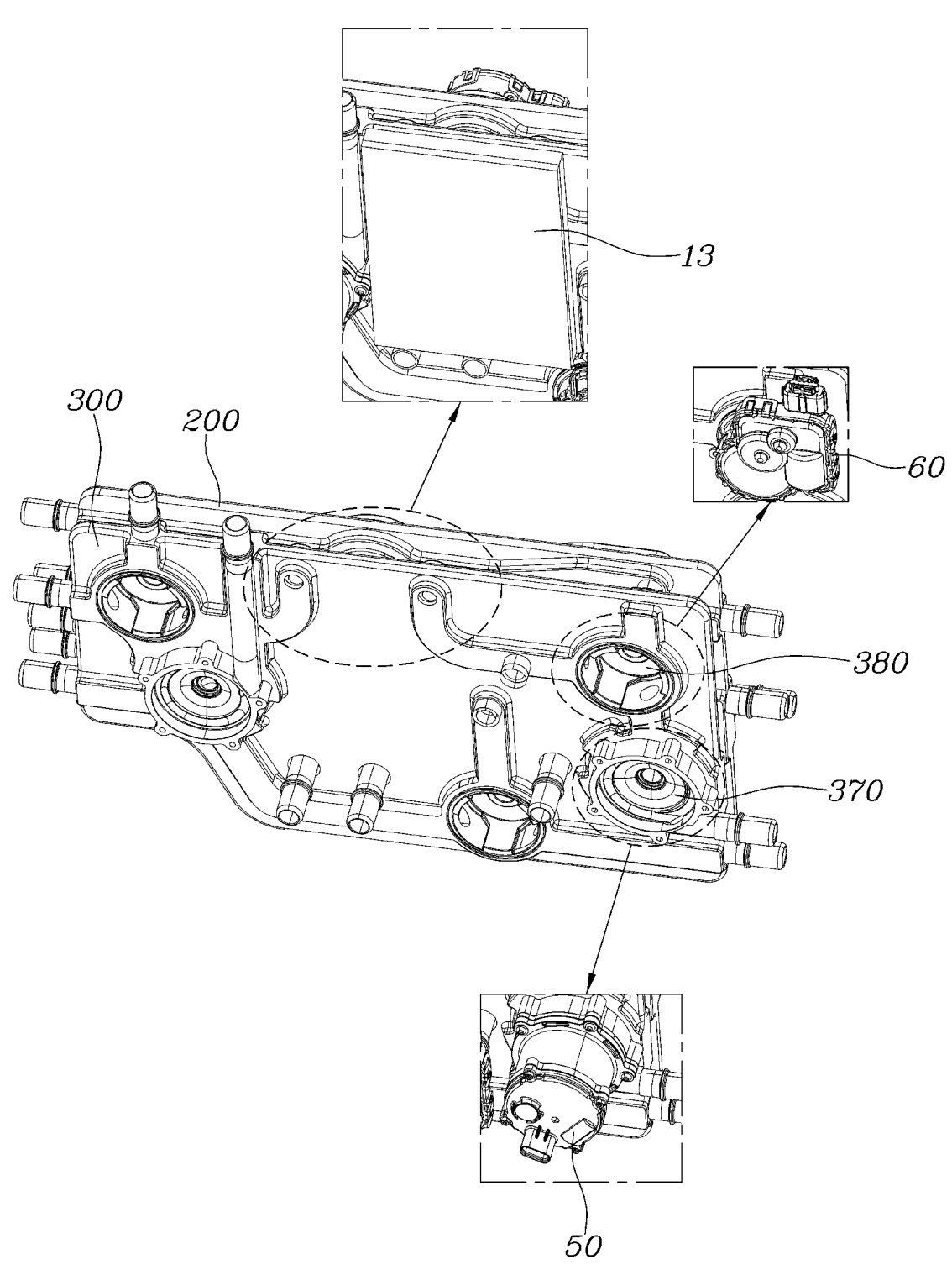
FIG. 8 shows a connection state of a coolant multi-channel plate applied to an integrated thermal management module for a vehicle according to an exemplary embodiment of the present invention.
Figure 9A:
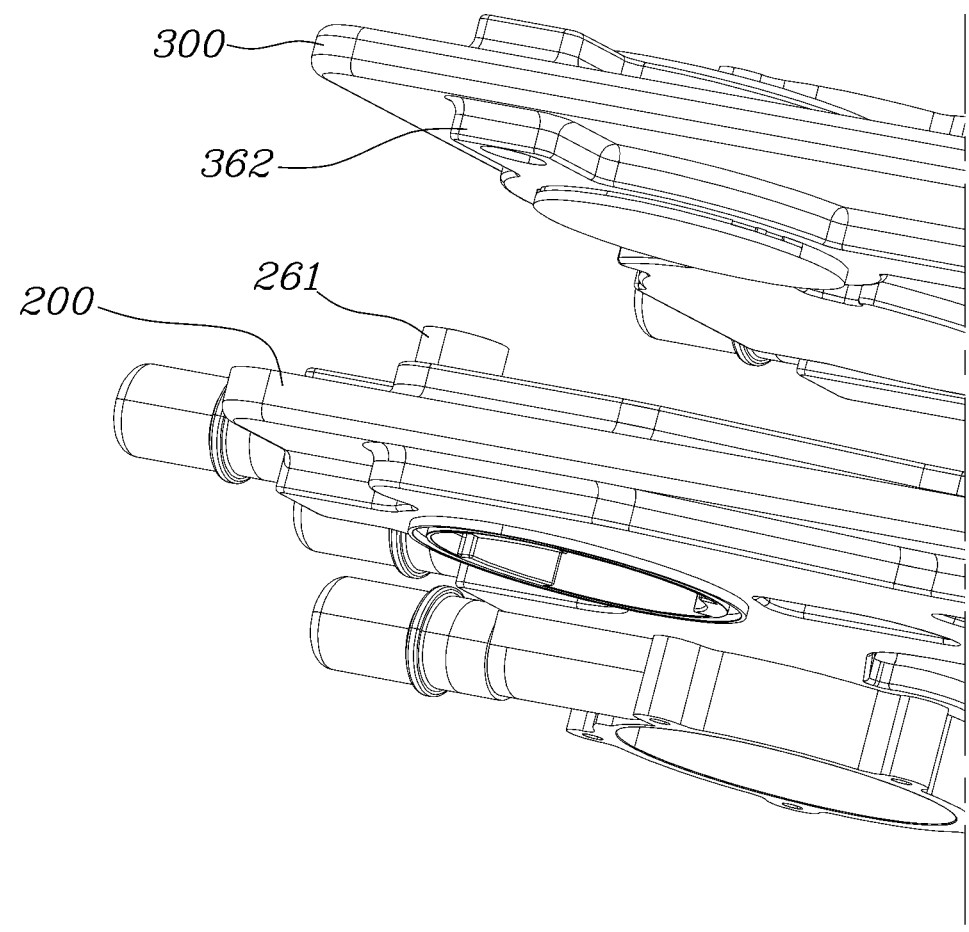
FIGS. 9A and 9B show a connection state of a first coolant multi-channel plate and a second coolant multi-channel plate applied to the integrated thermal management module according to the exemplary embodiment of the present invention.
Figure 9B:
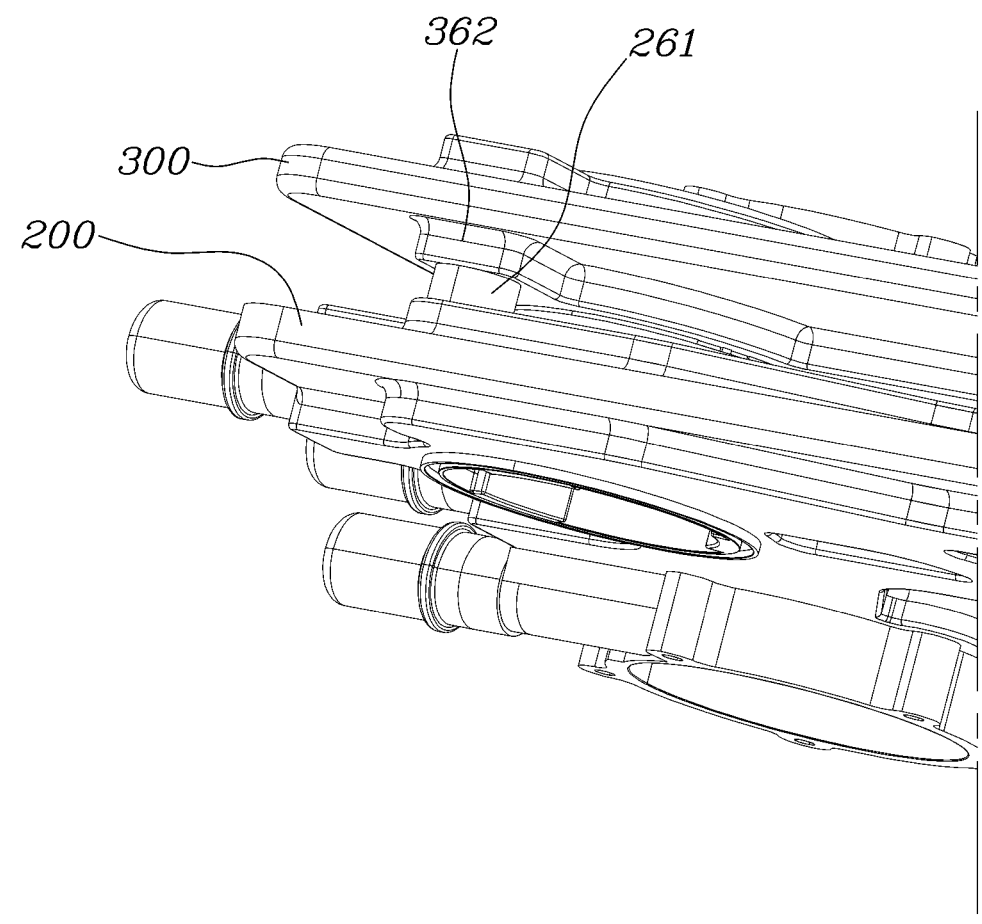

FIG. 8 is a view showing a connection state of a coolant multi-channel plate applied to an integrated thermal management module for a vehicle according to an exemplary embodiment of the present invention. FIGS. 9A and 9B are views showing a connection state of a first coolant multi-channel plate and a second coolant multi-channel plate applied to the integrated thermal management module according to the exemplary embodiment of the present invention.

First, as shown in the drawings, a first coolant multi-channel plate 200 and a second coolant multi-channel plate 300 are formed to have a plate shape. Accordingly, the first coolant multi-channel plate 100 and the second coolant multi-channel plate 300 are disposed such that one surface of the first coolant multi-channel plate 100 and one surface of the second coolant multi-channel plate 300 are spaced apart from each other while facing each other.

In this case, the first coolant multi-channel plate 200 is formed with at least one first coolant inlet connector 261 connected to a first inner coolant channel 201, and the second coolant multi-channel plate 300 is formed with at least one second coolant outlet connector 362 connected to a second inner coolant channel 301. In this embodiment, the first coolant inlet connector 261 is provided in number of two, and the second coolant outlet connector 362 is provided in number of two.

Accordingly, as the first coolant inlet connector 261 and the second coolant outlet connector 362 are interconnected, a coolant circulates between the first coolant multi-channel plate 200 and the second coolant multi-channel plate 300.

In detail, as shown in FIGS. 9A and 9B, the first coolant inlet connector 261 is formed to protrude from one surface of the first coolant multi-channel plate 200. In addition, the second coolant outlet connector 362 is formed to protrude from one surface of the second coolant multi-channel plate 300.

Accordingly, the first coolant inlet connector 261 and the second coolant outlet connector 362 are interconnected while directly contacting each other in a state in which the one surface of the first coolant multi-channel plate 200 and the one surface of the second coolant multi-channel plate 300 are disposed to face each other.

Meanwhile, as shown in FIGS. 6B and 7B, a plurality of pumps 50 and a plurality of valves 60 (cf. FIGS. 6A and 6B) are provided at the first inner coolant channel 201 of the first coolant multi-channel plate 200 and the second inner coolant channel 301 of the second coolant multi-channel plate 300.

In this case, the plurality of pumps 50 and the plurality of valves 60 are installed at the other surface of the first coolant multi-channel plate 200 and the other surface of the second coolant multi-channel plate 300. Accordingly, when the first coolant multi-channel plate 200 and the second coolant multi-channel plate 300 are disposed to face each other, the spacing therebetween should be minimized.

To this end, as shown in FIG. 8, a plurality of pump installation grooves 370 and a plurality of valve installation grooves 380 are formed at the other surface of the first coolant multi-channel plate 200 and the other surface of the second coolant multi-channel plate 300, to be formed to have a concave shape while communicating with the first inner coolant channel 201 and the second inner coolant channel 301. Accordingly, each pump 50 and each valve 60 are installed in corresponding ones of the pump installation grooves 370 and the valve installation grooves 380, respectively, such that portions of the pump 50 and the valve 60 are inserted into the corresponding pump installation groove 370 and the corresponding valve installation groove 380, respectively.

Meanwhile, as shown in FIG. 1, it is preferred that the refrigerant multi-channel plate 100 be disposed to be spaced apart from the other surface of the second coolant multi-channel plate 300 by a predetermined distance while facing the other surface of the second coolant multi-channel plate 300. Thus, as the refrigerant multi-channel plate 100, the second coolant multi-channel plate 300, and the first coolant multi-channel plate 200 are assembled to form a stacked structure in which the refrigerant multi-channel plate 100, the second coolant multi-channel plate 300, and the first coolant multi-channel plate 200 are sequentially spaced apart from one another by a predetermined distance, the refrigerant module and the coolant module may be implemented to be compact. In particular, as the first chiller 143 and the second chiller 123 are disposed between the refrigerant multi-channel plate 100 and the second coolant multi-channel plate 300, the refrigerant module and the coolant module may be implemented to be further compact.

Meanwhile, although not illustrated in this embodiment, an insulator (not shown) may be disposed between the one surface of the first coolant multi-channel plate 200 and the one surface of the second coolant multi-channel plate 300 in order to minimize thermal interference between the first coolant multi-channel plate 200 and the second coolant multi-channel plate 300.

In addition, an insulator (not shown) may be further disposed at the other surface of the first coolant multi-channel plate 200 and the other surface of the second coolant multi-channel plate 300, for heat maintenance of the coolant flowing in the first coolant multi-channel plate 200 and the second coolant multi-channel plate 300.

Meanwhile, the present invention may further include a configuration in which heat exchange between refrigerants is achieved in order to enhance utility of energy.

Figure 10A:
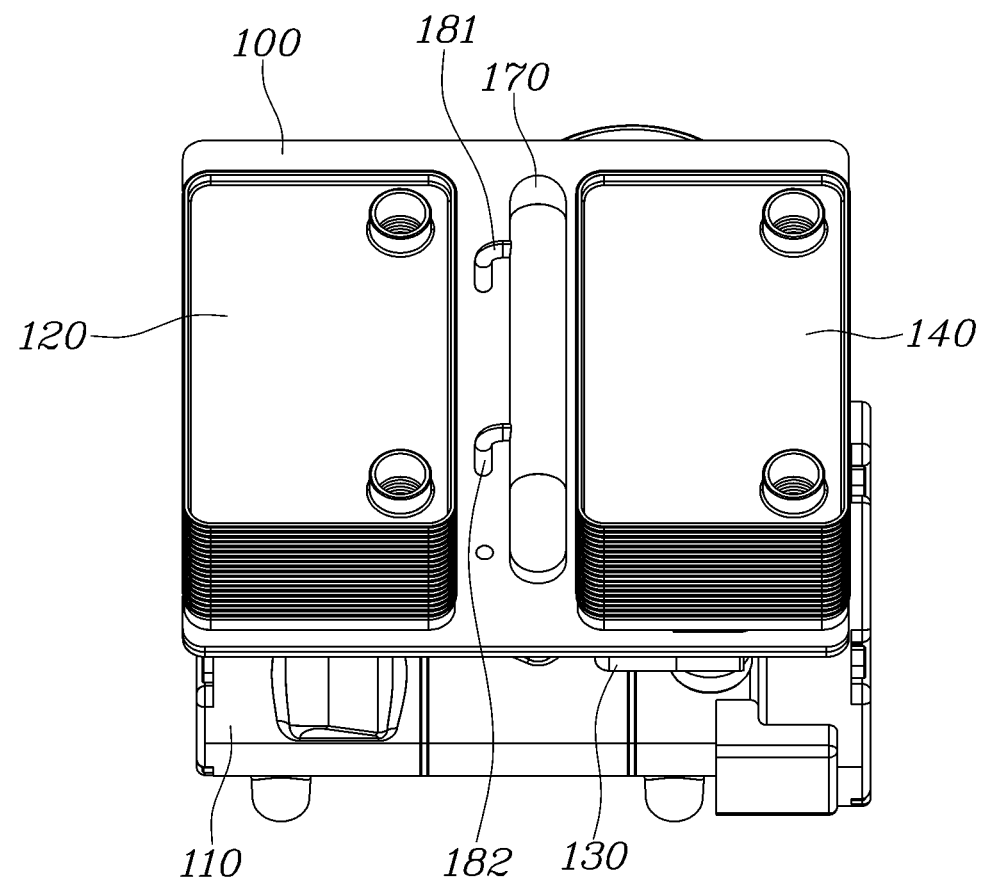
FIGS. 10A to 10C show a refrigerant module of an integrated thermal management module for a vehicle according to another exemplary embodiment of the present invention.
Figure 10B:
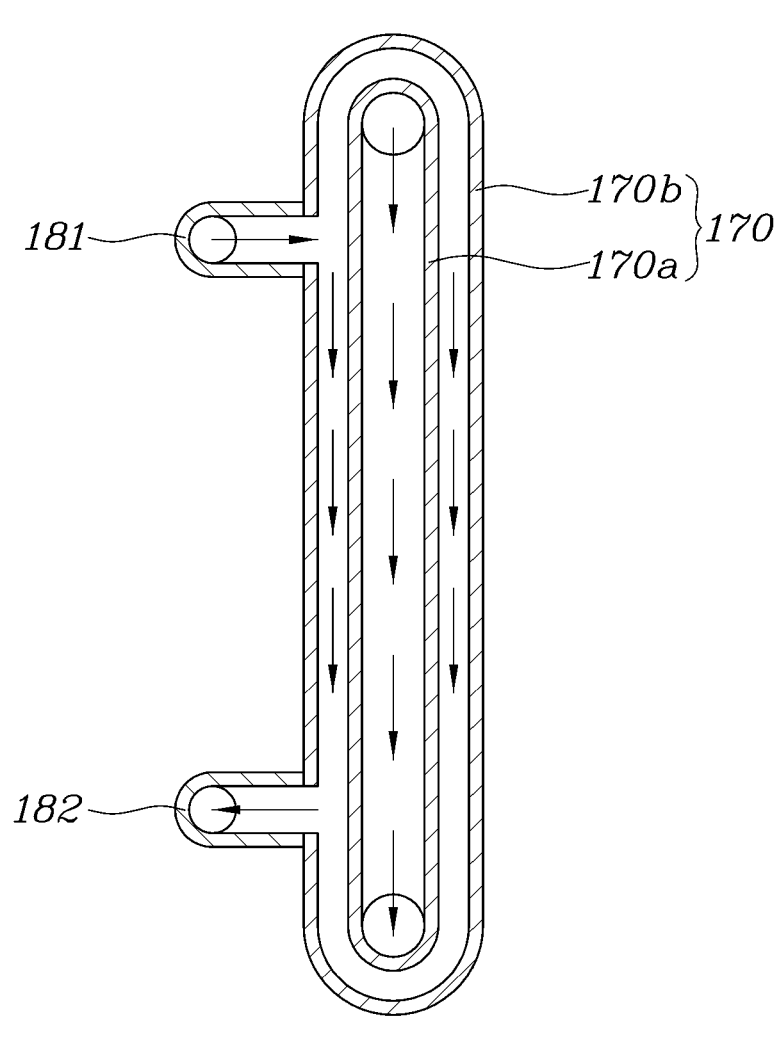
Figure 10C:
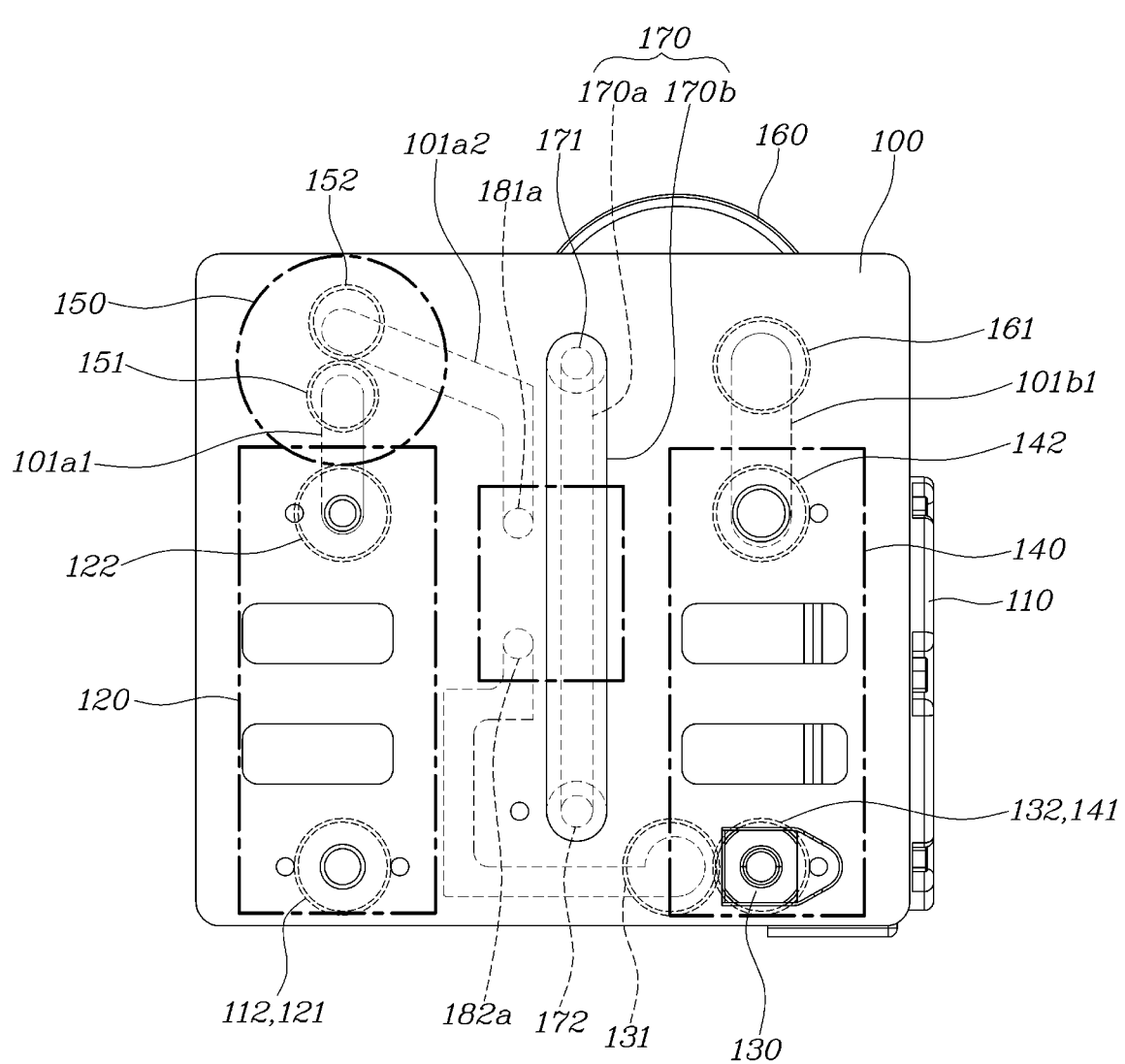

FIGS. 10A to 10C are views showing a refrigerant module of an integrated thermal management module for a vehicle according to another exemplary embodiment of the present invention.

As shown in FIGS. 10A to 10C, the refrigerant module according to the other exemplary embodiment of the present invention further includes, in addition to the configuration of the previous embodiment of the present invention, a heat exchange pipe 170 having a double pipe structure such that heat exchange is achieved between a refrigerant introduced into the expansion valve 130 after being discharged from the condensation core 120 and a refrigerant introduced into the compressor 110 after being discharged from the evaporation core 140.

The heat exchange pipe 170 is configured separately from the refrigerant multi-channel plate 100 and, as such, is configured to be connected to the refrigerant multi-channel plate 100. The heat exchange pipe 170 is formed to have a double pipe structure having an inner pipe 170a and an outer pipe 170b, and is disposed at the other side of the refrigerant multi-channel plate 100, that is, between the condensation core 120 and the evaporation core 140.

Accordingly, the inner pipe 170a of the heat exchange pipe 170 is connected, at one end thereof, to the second inner refrigerant channel 101b while being connected, at the other end thereof, to the compressor 110 and, as such, a refrigerant discharged from the evaporation core 140 flows through the heat exchange pipe 170.

In detail, in the previous embodiment, the second inner refrigerant channel 101b is divided into the 2-1-th inner refrigerant channel 101b1 configured to provide the path through which the refrigerant discharged from the evaporation core 140 is sucked into the accumulator 160, and the 2-2-th inner refrigerant channel 101b2 configured to provide the path through which the refrigerant discharged from the accumulator 160 is sucked into the compressor 110. In this embodiment, however, the 2-2-th inner refrigerant channel 101b2 is omitted, and the inner pipe 170a of the heat exchange pipe 170 provides a path through which the refrigerant discharged from the accumulator 160 is sucked into the compressor 110.

For this configuration, the inner pipe 170a of the heat exchange pipe 170 is connected, at one end thereof, to the accumulator outlet 162 at the other surface of the refrigerant multi-channel plate 100 while being connected, at the other end thereof, to the compressor inlet 111 at the other surface of the multi-channel plate 100.

In detail, a heat exchange pipe inlet 171 and a heat exchange pipe outlet 172, to which the heat exchange pipe 170 is coupled, are formed at the other surface of the refrigerant multi-channel plate 100.

In this case, the accumulator outlet 162 and the heat exchange pipe inlet 171 are formed at the opposite surfaces of the refrigerant multi-channel plate 100, respectively, and, as such, communicate with each other. Accordingly, as the accumulator 160 is coupled to the accumulator outlet 162, and the heat exchange pipe 170 is coupled to the heat exchange pipe inlet 171, the accumulator 160 and the heat exchange pipe 170 are directly interconnected via the refrigerant multi-channel plate 100. Accordingly, the refrigerant discharged from the accumulator 160 is introduced into the compressor 110 after flowing through the inner pipe 170a of the heat exchange pipe 170.

In addition, the heat exchange pipe outlet 172 and the compressor inlet 111 are formed at the opposite surfaces of the refrigerant multi-channel plate 100, respectively, and, as such, communicate with each other. Accordingly, as the heat exchange pipe 170 is coupled to the heat exchange pipe outlet 172, and the compressor 110 is coupled to the compressor inlet 111, the heat exchange pipe 170 and the compressor 110 are directly interconnected via the refrigerant multi-channel plate 100.

Meanwhile, the outer pipe 170b of the heat exchange pipe 170 is connected, at opposite sides thereof, to the first inner refrigerant channel 101a and, as such, the refrigerant discharged from the condensation core 120 flows through the outer pipe 170b.

In detail, in the previous embodiment, the first inner refrigerant channel 101a is divided into the 1-1-th inner refrigerant channel 101a1 configured to provide the path through which the refrigerant discharged from the condensation core 120 is sucked into the receiver dryer 150, and the 1-2-th inner refrigerant channel 101a2 configured to provide the path through which a refrigerant discharged from the receiver dryer 150 is sucked into the expansion valve 130. In this embodiment, however, an inlet connection pipe 181 and an outlet connection pipe 182 are connected to intermediate points of the 1-2-th inner refrigerant channel 101a2, respectively, to return a refrigerant after forcing the refrigerant to flow though the outer pipe 170b of the heat exchange pipe 170, and, as such, provide a path through which a refrigerant discharged from the receiver dryer 150 is sucked into the expansion valve 130.

For this configuration, the inlet connection pipe 181 is connected to one side of the outer pipe 170b of the heat exchange pipe 170, and the outlet connection pipe 182 is connected to the other side of the outer pipe 170b.

In addition, a connection pipe inlet 181a, to which the inlet connection pipe 181 is connected, and a connection pipe outlet 182a, to which the outlet connection pipe 182 is connected, are formed at a surface of the refrigerant multi-channel plate 100 at intermediate points of the 1-2-th inner refrigerant channel 101a2.

As such, the inlet connection pipe 181 is coupled to the connection pipe inlet 181a formed at the 1-2-th inner refrigerant channel 101a2, and the outlet connection pipe 182 is coupled to the connection pipe outlet 182a formed at the 1-2-th inner refrigerant channel 101a2. Accordingly, the refrigerant discharged from the receiver dryer 150 is introduced into the expansion valve 130 after flowing through a portion of the 1-2-th inner refrigerant channel 101a2, the inlet connection pipe 181, the outer pipe 170b of the heat exchange pipe 170, the outlet connection pipe 182, and the remaining portion of the 1-2-th inner refrigerant channel 101a2.

Meanwhile, as the refrigerant discharged from the evaporation core 140 flows through the inner pipe 170a of the heat exchange pipe 170, and the refrigerant discharged from the condensation core 120 flows through the outer pipe 170b of the heat exchange pipe 170, heat exchange is achieved between the refrigerants.

In detail, the refrigerant flowing through the outer pipe 170b of the heat exchange pipe 170 after being condensed in the condensation core 120 has a higher temperature than that of the refrigerant flowing through the inner pipe 170a of the heat exchange pipe 170 after being evaporated in the evaporation core 140. Accordingly, heat of the condensed refrigerant flowing through the outer pipe 170b of the heat exchange pipe 170 is absorbed by the refrigerant flowing through the inner pipe 170a of the heat exchange pipe 170. As the heat-absorbing refrigerant is sucked into the compressor 110, energy efficiency of the compressor 110 may be enhanced.

As apparent from the above description, in accordance with the exemplary embodiments of the present invention, complicated parts and lines associated with a coolant and a refrigerant may be modularized through integration and, as such, compactness thereof may be achieved.

In addition, parts, through which coolants of different temperature ranges circulate, respectively, may be modularized while being distinguished from the former parts and lines, to minimize thermal interference between the modules, and, as such, it may be possible to achieve an enhancement in thermal management efficiency.

In addition, in accordance with the exemplary embodiments of the present invention, a path, through which a refrigerant circulates, may be minimized. Accordingly, an effect of enhancing heat exchange efficiency of the refrigerant exchanging heat with a coolant while reducing the amount of the circulating refrigerant may be expected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated thermal management module comprising:

a compressor configured to discharge a refrigerant after compressing the refrigerant;

a condensation core configured to discharge the refrigerant discharged from the compressor after the refrigerant exchanges heat with a coolant;

an evaporation core configured to discharge the refrigerant discharged from an expansion valve after the refrigerant exchanges heat with the coolant;

a refrigerant multi-channel plate formed to have a plate shape, the refrigerant multi-channel plate comprising:

a first inner refrigerant channel configured to provide a path guiding the refrigerant discharged from the condensation core to the expansion valve; and a second inner refrigerant channel configured to provide a path guiding the refrigerant discharged from the evaporation core to the compressor;

a coolant multi-channel plate comprising:

a first coolant multi-channel plate having a first inner coolant channel configured to guide the coolant cooled through heat exchange in the evaporation core to flow through the first inner coolant channel;

a second coolant multi-channel plate having a second inner coolant channel configured to guide the coolant heated through heat exchange in the condensation core to flow through the second inner coolant channel, the second inner coolant channel being independent from the first inner coolant channel, wherein the first coolant multi-channel plate and the second coolant multi-channel plate are disposed such that a first surface of the first coolant multi-channel plate and a first surface of the second coolant multi-channel plate are spaced apart from each other by a first predetermined distance while facing each other, wherein the coolant in the first coolant multi-channel plate exchanges heat with the refrigerant flowing in the evaporation core, and wherein the coolant in the second coolant multi-channel plate exchanges heat with the refrigerant flowing in the condensation core; and a heat exchange pipe formed to have a double pipe structure having an inner pipe and an outer pipe, wherein the inner pipe is connected at a first end to the second inner refrigerant channel while being connected at a second end to the compressor such that the refrigerant discharged from the evaporation core flows through the inner pipe of the heat exchange pipe to the compressor, wherein the outer pipe is connected to the first inner refrigerant channel such that the refrigerant discharged from the condensation core flows through the outer pipe to the expansion valve, wherein the refrigerant flowing through the inner pipe is heated by the refrigerant flowing through the outer pipe before being introduced into the compressor, and wherein the refrigerant flowing through the outer pipe is cooled by the refrigerant flowing through the inner pipe before being introduced into the expansion valve;

wherein the compressor and the expansion valve are disposed on a first side of the refrigerant multi-channel plate and the condensation core and the evaporation core are disposed on a second side of the refrigerant multi-channel plate;

wherein the compressor and the condensation core are directly interconnected through the refrigerant multi-channel plate;

wherein the condensation core and the expansion valve are mounted to the refrigerant multi-channel plate and interconnected by the first inner refrigerant channel and the outer pipe of the heat exchange pipe;

wherein the expansion valve and the evaporation core are directly interconnected through the refrigerant multi-channel plate;

wherein the evaporation core and the compressor are mounted to the refrigerant multi-channel plate and interconnected by the second inner refrigerant channel and the inner pipe of the heat exchange pipe; and wherein the compressor and the inner pipe of the heat exchange pipe are directly interconnected through the refrigerant multi-channel plate.

2. The integrated thermal management module according to claim 1, wherein:

the refrigerant multi-channel plate is formed with a compressor inlet and a compressor outlet coupled to the compressor, a condensation core inlet and a condensation core outlet coupled to the condensation core, an expansion valve inlet and an expansion valve outlet coupled to the expansion valve, and an evaporation core inlet and an evaporation core outlet coupled to the evaporation core;

the compressor outlet and the condensation core inlet are formed on opposite surfaces of the refrigerant multi-channel plate to directly interconnect the compressor and the condensation core;

the condensation core outlet and the expansion valve inlet are interconnected by the first inner refrigerant channel and the outer pipe of the heat exchange pipe;

the expansion valve outlet and the evaporation core inlet are formed on the opposite surfaces of the refrigerant multi-channel plate to directly interconnect the expansion valve and the evaporation core;

the evaporation core outlet is connected to the inner pipe of the heat exchange pipe via the second inner refrigerant channel; and the compressor inlet and the inner pipe of the heat exchange pipe are disposed on the opposite surfaces of the refrigerant multi-channel plate to directly interconnect the compressor and the inner pipe of the heat exchange pipe.

3. The integrated thermal management module according to claim 1, further comprising:

a receiver dryer on the first side of the refrigerant multi-channel plate, wherein the receiver dryer is configured to separate the refrigerant discharged from the condensation core into a first liquid-phase refrigerant and a first gas-phase refrigerant and to discharge the first liquid-phase refrigerant into the expansion valve; and an accumulator on the first side of the refrigerant multi-channel plate, wherein the accumulator is configured to separate the refrigerant discharged from the evaporation core into a second liquid-phase refrigerant and a second gas-phase refrigerant and to discharge the second gas-phase refrigerant into the compressor;

wherein the first inner refrigerant channel of the refrigerant multi-channel plate is divided into a 1-1-th inner refrigerant channel configured to provide a path guiding the refrigerant discharged from the condensation core to the receiver dryer and a 1-2-th inner refrigerant channel configured to provide a path guiding the first liquid-phase refrigerant discharged from the receiver dryer to the expansion valve;

wherein an inlet connection pipe connected to a first side of the outer pipe of the heat exchange pipe and an outlet connection pipe connected to a second side of the outer pipe of the heat exchange pipe are connected to an intermediate portion of the 1-2-th inner refrigerant channel; and wherein the second inner refrigerant channel of the refrigerant multi-channel plate is a 2-1-th inner refrigerant channel configured to provide a path guiding the refrigerant discharged from the evaporation core to the accumulator, and provides a path guiding the refrigerant discharged from the accumulator to the compressor via the inner pipe of the heat exchange pipe.

4. The integrated thermal management module according to claim 1, wherein each of the first coolant multi-channel plate and the second coolant multi-channel plate is formed to have a plate shape.

5. The integrated thermal management module according to claim 4, wherein the refrigerant multi-channel plate is disposed to be spaced apart from a second surface of the second coolant multi-channel plate by a second predetermined distance while facing the second surface of the second coolant multi-channel plate.

6. The integrated thermal management module according to claim 5, wherein the condensation core and the evaporation core are disposed between the refrigerant multi-channel plate and the second coolant multi-channel plate.

7. The integrated thermal management module according to claim 1, wherein:

the first coolant multi-channel plate comprises at least one first coolant inlet connector connected to the first inner coolant channel;

the second coolant multi-channel plate comprises at least one second coolant outlet connector connected to the second inner coolant channel; and the coolant circulates between the first coolant multi-channel plate and the second coolant multi-channel plate through interconnection of the first coolant inlet connector and the second coolant outlet connector.

8. The integrated thermal management module according to claim 7, wherein:

the first coolant inlet connector protrudes from the first surface of the first coolant multi-channel plate;

the second coolant outlet connector protrudes from the first surface of the second coolant multi-channel plate; and the first coolant inlet connector and the second coolant outlet connector are interconnected while directly contacting each other.

9. An integrated thermal management module comprising:

a refrigerant module configured to force a refrigerant to circulate through a compressor, a condensation core, an expansion valve, and an evaporation core, the refrigerant module comprising a refrigerant multi-channel plate, wherein the compressor and the expansion valve are disposed on a first side of the refrigerant multi-channel plate, wherein the condensation core and the evaporation core are disposed on a second side of the refrigerant multi-channel plate, wherein the refrigerant multi-channel plate comprises:

a first inner refrigerant channel configured to provide a path guiding the refrigerant discharged from the condensation core to the expansion valve, and a second inner refrigerant channel configured to provide a path guiding the refrigerant discharged from the evaporation core to the compressor;

a coolant module comprising a coolant multi-channel plate formed with an inner coolant channel, wherein the condensation core and the evaporation core of the refrigerant module, an air conditioning core of an indoor air conditioner, an electrical part, a radiator, and a battery are interconnected via the inner coolant channel while being connected to the coolant multi-channel plate via a plurality of separate coolant connection lines connected to the coolant multi-channel plate, and wherein the coolant multi-channel plate comprises:

a first coolant multi-channel plate having a first inner coolant channel guiding a coolant cooled through heat exchange in the evaporation core to flow through the first inner coolant channel, a second coolant multi-channel plate having a second inner coolant channel guiding the coolant heated through heat exchange in the condensation core to flow through the second inner coolant channel, the second inner coolant channel being independent from the first inner coolant channel, wherein the first coolant multi-channel plate and the second coolant multi-channel plate are disposed such that a first surface of the first coolant multi-channel plate and a first surface of the second coolant multi-channel plate are spaced apart from each other by a first predetermined distance while facing each other, wherein the coolant circulating in the first coolant multi-channel plate exchanges heat with the refrigerant flowing in the evaporation core of the refrigerant module, and wherein the coolant circulating in the second coolant multi-channel plate exchanges heat with the refrigerant flowing in the condensation core of the refrigerant module; and a heat exchange pipe formed to have a double pipe structure having an inner pipe and an outer pipe, wherein the inner pipe is connected at a first end to the second inner refrigerant channel while being connected at a second end to the compressor such that the refrigerant discharged from the evaporation core flows through the inner pipe of the heat exchange pipe to the compressor, wherein the outer pipe is connected to the first inner refrigerant channel such that the refrigerant discharged from the condensation core flows through the outer pipe to the expansion valve, wherein the refrigerant flowing through the inner pipe is heated by the refrigerant flowing through the outer pipe before being introduced into the compressor, and wherein the refrigerant flowing through the outer pipe is cooled by the refrigerant flowing through the inner pipe before being introduced into the expansion valve.

10. The integrated thermal management module according to claim 9, wherein:

the refrigerant multi-channel plate is formed with a compressor inlet and a compressor outlet coupled to the compressor, a condensation core inlet and a condensation core outlet coupled to the condensation core, an expansion valve inlet and an expansion valve outlet coupled to the expansion valve, and an evaporation core inlet and an evaporation core outlet coupled to the evaporation core.

11. The integrated thermal management module according to claim 10, wherein:

the compressor outlet and the condensation core inlet are formed at opposite surfaces of the refrigerant multi-channel plate to directly interconnect the compressor and the condensation core via the refrigerant multi-channel plate; and the expansion valve outlet and the evaporation core inlet are formed at the opposite surfaces of the refrigerant multi-channel plate to directly interconnect the expansion valve and the evaporation core via the refrigerant multi-channel plate.

12. The integrated thermal management module according to claim 9, wherein:

the refrigerant multi-channel plate is formed with a compressor inlet and a compressor outlet coupled to the compressor, a condensation core inlet and a condensation core outlet coupled to the condensation core, an expansion valve inlet and an expansion valve outlet coupled to the expansion valve, and an evaporation core inlet and an evaporation core outlet coupled to the evaporation core;

the compressor outlet and the condensation core inlet are formed at opposite surfaces of the refrigerant multi-channel plate to directly interconnect the compressor and the condensation core;

the condensation core outlet and the expansion valve inlet are interconnected by the first inner refrigerant channel and the outer pipe of the heat exchange pipe;

the expansion valve outlet and the evaporation core inlet are formed at the opposite surfaces of the refrigerant multi-channel plate to directly interconnect the expansion valve and the evaporation core;

the evaporation core outlet is connected to the inner pipe of the heat exchange pipe via the second inner refrigerant channel; and the compressor inlet and the inner pipe of the heat exchange pipe are disposed at the opposite surfaces of the refrigerant multi-channel plate to directly interconnect the compressor and the inner pipe of the heat exchange pipe.

13. The integrated thermal management module according to claim 9, wherein each of the first coolant multi-channel plate and the second coolant multi-channel plate is formed to have a plate shape.

14. The integrated thermal management module according to claim 9, wherein:

the first coolant multi-channel plate is formed with at least one first coolant inlet connector connected to the first inner coolant channel;

the second coolant multi-channel plate is formed with at least one second coolant outlet connector connected to the second inner coolant channel; and a coolant circulates between the first coolant multi-channel plate and the second coolant multi-channel plate through interconnection of the first coolant inlet connector and the second coolant outlet connector.

15. The integrated thermal management module according to claim 14, wherein:

the first coolant inlet connector protrudes from the first surface of the first coolant multi-channel plate;

the second coolant outlet connector protrudes from the first surface of the second coolant multi-channel plate; and the first coolant inlet connector and the second coolant outlet connector are interconnected while directly contacting each other.

16. The integrated thermal management module according to claim 9, wherein a plurality of pumps and a plurality of valves are provided at the first inner coolant channel of the first coolant multi-channel plate and the second inner coolant channel of the second coolant multi-channel plate.

17. The integrated thermal management module according to claim 16, wherein the plurality of pumps and the plurality of valves are installed at a second surface of the first coolant multi-channel plate and a second surface of the second coolant multi-channel plate.

18. The integrated thermal management module according to claim 17, wherein a plurality of pump installation grooves and a plurality of valve installation grooves are formed on the second surface of the first coolant multi-channel plate and the second surface of the second coolant multi-channel plate, and wherein the plurality of pump installation grooves and the plurality of valve installation grooves have a concave shape while communicating with the first inner coolant channel and the second inner coolant channel, such that each pump and each valve are installed in corresponding ones of the pump installation grooves and the valve installation grooves, respectively, in such a manner that portions of the pump and the valve are inserted into the corresponding pump installation groove and the corresponding valve installation groove, respectively.

19. The integrated thermal management module according to claim 9, wherein:

a first insulator is disposed between the first surface of the first coolant multi-channel plate and the first surface of the second coolant multi-channel plate; and a second insulator is disposed between a second surface of the first coolant multi-channel plate and a second surface of the second coolant multi-channel plate.

20. The integrated thermal management module according to claim 9, wherein:

the radiator comprises a first radiator connected to the battery and a second radiator connected to the air conditioning core of the indoor air conditioner and the electrical part;

the air conditioning core of the indoor air conditioner comprises a cold core; and the first coolant multi-channel plate is formed with a first radiator inlet and a first radiator outlet connected to the first radiator, a second radiator inlet and a second radiator outlet connected to the second radiator, an electrical part inlet and an electrical part outlet connected to the electrical part, an evaporation core coolant inlet and an evaporation core coolant outlet connected to the evaporation core of the refrigerant module, and a cold core inlet and a cold core outlet connected to the cold core.

21. The integrated thermal management module according to claim 9, wherein:

the radiator comprises a third radiator connected to the air conditioning core of the indoor air conditioner and the battery;

the air conditioning core of the indoor air conditioner comprises a water heater and a hot core; and the second coolant multi-channel plate is formed with a third radiator inlet and a third radiator outlet connected to the third radiator, a condensation core coolant inlet and a condensation core coolant outlet connected to the condensation core of the refrigerant module, a water heater inlet and a water heater outlet connected to the water heater, a hot core inlet and a hot core outlet connected to the hot core, and a battery inlet and a battery outlet connected to the battery.

22. The integrated thermal management module according to claim 9, wherein:

the refrigerant multi-channel plate is formed to have a plate shape;

the refrigerant multi-channel plate is disposed to be spaced apart from a second surface of the second coolant multi-channel plate by a second predetermined distance while facing the second surface of the second coolant multi-channel plate; and the condensation core and the evaporation core are disposed between the refrigerant multi-channel plate and the second coolant multi-channel plate.

23. The integrated thermal management module according to claim 9, further comprising:

a receiver dryer configured to separate the refrigerant discharged from the condensation core into a first liquid-phase refrigerant and a first gas-phase refrigerant and to discharge the first liquid-phase refrigerant into the expansion valve; and an accumulator configured to separate the refrigerant discharged from the evaporation core into a second liquid-phase refrigerant and a second gas-phase refrigerant and to discharge the second gas-phase refrigerant into the compressor, wherein the receiver dryer and the accumulator are disposed at one side of the refrigerant multi-channel plate.

24. The integrated thermal management module according to claim 9, wherein the compressor and the condensation core are directly interconnected through the refrigerant multi-channel plate.

25. The integrated thermal management module according to claim 9, wherein the condensation core and the expansion valve are mounted to the refrigerant multi-channel plate and interconnected by the first inner refrigerant channel.

26. An integrated thermal management module comprising:

a refrigerant module configured to force a refrigerant to circulate through a compressor, a condensation core, an expansion valve, and an evaporation core, the refrigerant module comprising a refrigerant multi-channel plate;

wherein the compressor and the expansion valve are disposed on a first side of the refrigerant multi-channel plate;

wherein the condensation core and the evaporation core are disposed on a second side of the refrigerant multi-channel plate;

wherein the refrigerant multi-channel plate comprises:

a first inner refrigerant channel configured to provide a path guiding the refrigerant discharged from the condensation core to the expansion valve; and a second inner refrigerant channel configured to provide a path guiding the refrigerant discharged from the evaporation core to the compressor; and wherein the refrigerant multi-channel plate is formed to have a plate shape;

a coolant module comprising a coolant multi-channel plate having an inner coolant channel;

wherein the condensation core and the evaporation core of the refrigerant module, an air conditioning core of an indoor air conditioner, an electrical part, a radiator, and a battery are interconnected via the inner coolant channel while being connected to the coolant multi-channel plate via a plurality of separate coolant connection lines connected to the coolant multi-channel plate;

wherein the coolant multi-channel plate comprises:

a first coolant multi-channel plate having a first inner coolant channel guiding a coolant cooled through heat exchange in the evaporation core to flow through the first inner coolant channel; and a second coolant multi-channel plate having a second inner coolant channel guiding the coolant heated through heat exchange in the condensation core to flow through the second inner coolant channel, the second inner coolant channel being independent from the first inner coolant channel;

wherein each of the first coolant multi-channel plate and the second coolant multi-channel plate is formed to have a plate shape;

wherein the first coolant multi-channel plate and the second coolant multi-channel plate are disposed such that a first surface of the first coolant multi-channel plate and a first surface of the second coolant multi-channel plate are spaced apart from each other by a first predetermined distance while facing each other;

wherein the refrigerant multi-channel plate is disposed to be spaced apart from a second surface of the second coolant multi-channel plate by a second predetermined distance while facing the second surface of the second coolant multi-channel plate;

wherein the condensation core and the evaporation core are disposed between the refrigerant multi-channel plate and the second coolant multi-channel plate;

wherein the coolant circulating in the first coolant multi-channel plate exchanges heat with the refrigerant flowing in the evaporation core of the refrigerant module; and wherein the coolant circulating in the second coolant multi-channel plate exchanges heat with the refrigerant flowing in the condensation core of the refrigerant module; and a heat exchange pipe formed to have a double pipe structure having an inner pipe and an outer pipe;

wherein the inner pipe is connected at a first end to the second inner refrigerant channel while being connected at a second end to the compressor such that the refrigerant discharged from the evaporation core flows through the inner pipe of the heat exchange pipe to the compressor;

wherein the outer pipe is connected to the first inner refrigerant channel such that the refrigerant discharged from the condensation core flows through the outer pipe to the expansion valve;

wherein the refrigerant flowing through the inner pipe is heated by the refrigerant flowing through the outer pipe before being introduced into the compressor; and wherein the refrigerant flowing through the outer pipe is cooled by the refrigerant flowing through the inner pipe before being introduced into the expansion valve.

* * * * *